United States Patent [19]
Thomas et al.

[11] Patent Number: 5,785,736
[45] Date of Patent: *Jul. 28, 1998

[54] GOLD RECOVERY FROM REFRACTORY CARBONACEOUS ORES BY PRESSURE OXIDATION, THIOSULFATE LEACHING AND RESIN-IN-PULP ADSORPTION

[75] Inventors: Kenneth G. Thomas, Mississauga; Christopher Fleming, Peterborough; Andrew R. Marchbank, Oakville; David Dreisinger, Delta, all of Canada

[73] Assignee: Barrick Gold Corporation, Toronto, Canada

[*] Notice: The term of this patent shall not extend beyond the expiration date of Pat. No. 5,536,297.

[21] Appl. No.: 680,906

[22] Filed: Jul. 16, 1996

Related U.S. Application Data

[63] Continuation-in-part of Ser. No. 389,016, Feb. 2, 1995, Pat. No. 5,536,297.

[51] Int. Cl.$^6$ ............................................. C22B 3/46
[52] U.S. Cl. ............................. 75/736; 75/744; 204/109
[58] Field of Search ..................... 75/736, 744; 204/109

[56] References Cited

U.S. PATENT DOCUMENTS

| | | | |
|---|---|---|---|
| 4,070,182 | 1/1978 | Berezowsky et al. | 75/103 |
| 4,269,622 | 5/1981 | Kerley, Jr. | 75/103 |
| 4,289,532 | 9/1981 | Matson et al. | 75/105 |
| 4,369,061 | 1/1983 | Kerley, Jr. | 75/103 |
| 4,384,889 | 5/1983 | Wiewiorowski et al. | 75/736 |
| 4,552,589 | 11/1985 | Mason et al. | 75/105 |
| 4,578,163 | 3/1986 | Kunter et al. | 204/110 |
| 4,654,078 | 3/1987 | Perez et al. | 75/118 |
| 4,723,998 | 2/1988 | O'Neil | 75/101 |
| 4,738,718 | 4/1988 | Bakshani et al. | 75/105 |
| 4,765,827 | 8/1988 | Clough et al. | 75/2 |
| 4,801,329 | 1/1989 | Clough et al. | 75/97 |
| 4,816,235 | 3/1989 | Pesic | 423/32 |
| 4,902,345 | 2/1990 | Ball et al. | 75/118 |
| 4,923,510 | 5/1990 | Ramadorai et al. | 423/29 |
| 4,925,485 | 5/1990 | Schulze | 423/22 |
| 5,071,477 | 12/1991 | Thomas et al. | 75/744 |
| 5,127,942 | 7/1992 | Breirley et al. | 75/743 |
| 5,215,575 | 6/1993 | Butler | 75/744 |
| 5,236,492 | 8/1993 | Shaw et al. | 75/744 |
| 5,354,359 | 10/1994 | Wan et al. | 75/744 |

FOREIGN PATENT DOCUMENTS

| | | |
|---|---|---|
| WO 91/11539 | 8/1991 | WIPO. |
| WO 94/06944 | 3/1994 | WIPO. |

OTHER PUBLICATIONS

Hemmati et al., Study of the Thiosulfate Leaching of Gold from Carbonaceous Ore and the Quantitative Determination of Thiosulfate in the Leached Solution; Extraction Metallurgy 1988 Symp., Inst. Min. Metall., London, Jan. 1989, pp. 665–678.

Gallagher et al., Affinity of Activated Carbon Towards Some Gold (I) Complexes, Hydrometallurgy, 25, Feb.1990, pp. 305–316.

Wan et al., Research and Development Activities for the Recovery of Gold from Noncyanide Solutions; Hydrometallurgy, Jan. 1993, pp. 428–431.

Gallagher, M.S. Thesis, University of Nevada–Reno, Interaction of Gold Cyanide, Thiosulfate, and Thiourea Complexes with Carbon Matrices, May 1987, i–x, 1–34.

Awadalla et al., The Recovery of Gold from Thiourea, Thiocyanate or Thiosulfate Solutions by Reduction–Precipitation with a Stabilized Form of Sodium Borohydride; Separation Science and Technology, 26(9), pp. 1207–28, Jan. 1991.

Tozawa et al., Dissolution of Gold in Ammoniacal Thiosulfate Solution, AIME/TMS, Jan. 1981, pp. 1–12.

Zipperian et al., Gold and Silver Extraction by Ammoniacal Thiosulfate Leaching from a Rhyolite Ore, Hydrometallurgy, 19, Jan. 1988, pp. 361–375.

Berezowsky et al., Recovery of Gold and Silver from Oxidation Leach Residues by Ammonicacal Thioslfate Leaching, AIME Meeting, Feb. 18–22, 1979, pp. 1–17.

Zipperian et al., Gold and Silver Extraction by Ammoniacal Thiosulfate Leaching from a Rhyolite Ore, Hydrometallurgy, 19, 1988, p. 361–375 No Month.

Langhans et al., Copper–catalyzed Thiosulfate Leaching of Lowgrade Gold Ores, Hydrometallurgy, 29, Jun. 1992, pp. 191–203.

Thomas et al., Alkaline and Acidic Autoclaving of Refractory Gold Ores; JOM, Feb. 1991, pp. 16–19.

Flett et al., Chemical Study of Thiosulfate Leaching of Silver Sulphide; TIMM, C92, pp. 216–23, Dec. 1983.

*Primary Examiner*—Melvyn Andrews
*Attorney, Agent, or Firm*—Senniger, Powers, Leavitt & Roedel

[57] ABSTRACT

A process for treatment of precious metal ores in which gold is leached from an oxidized ore slurry using a thiosulfate salt lixiviant and copper catalyst. Gold and copper are subsequently loaded onto an ion exchange resin. Copper is recovered from the resin by elution with a thiosulfate solution; gold is recovered from the resin by elution with a thiocyanate colution. Gold is recovered from the eluate by precipitation, electrowinning, or cementation.

32 Claims, 7 Drawing Sheets

GOLD RECOVERY FROM REFRACTORY CARBONACEOUS ORES BY PRESSURE OXIDATION, THIOSULFATE LEACHING AND RESIN-IN-PULP ADSORPTION

This is a continuation-in-part of application Ser. No. 08/389,016 filed Feb. 2, 1995, now U.S. Pat. No. 5,536,297, issued Jul. 16, 1996.

BACKGROUND OF THE INVENTION

This invention relates to the recovery of gold from ores and, more particularly, to a process for the recovery of gold which is especially suited for application to refractory carbonaceous ores.

Significant quantities of gold ore currently processed in North America include substantial portions of the sulfidic minerals arsenopyrite, pyrite and marcasite. The predominant sulfide minerals in the ore contain encapsulated gold. The gold in such ores is too fine to liberate economically merely by grinding. Leachants such as cyanide and thiosulfate cannot penetrate the metal sulfide particles. This problem has been overcome by pressure oxidation as disclosed in Thomas et al. U.S. Pat. No. 5,071,477. In such processes, the refractory ores are treated by pressure oxidation to oxidize sulfide sulfur before leaching. If the sulfide sulfur is not substantially oxidized, leaching is inhibited and gold remains locked in the sulfides. By treating the ore in an aqueous slurry at elevated temperature and oxygen pressure, the sulfur is oxidized and removed from the ore. Thereafter, the gold is readily leached with a leaching agent and acceptable yields result.

Pressure oxidation is typically performed by passage of ore slurry through a multi-compartmented autoclave to which an oxygen-containing gas is continuously supplied. Pressure oxidation typically occurs under acidic conditions, as oxidation of the sulfides in the ore produces sulfuric acid in the autoclave. For certain ores, the ore slurry may be treated with sulfuric acid prior to pressure oxidation to neutralize carbonates such that the slurry fed to the autoclave is acidic. Depending on the ore, however, pressure oxidation may be best effected under alkaline conditions, as in the process disclosed in Mason et al., U.S. Pat. No. 4,552,589.

Gold is typically recovered from pressure oxidized slurries using conventional cyanidation technology. The pH of the oxidized slurry is adjusted to between 10 and 11 with lime, and cyanide is added to solubilize the gold. Oxygen is dispersed through the slurry by agitation, and gold dissolves by the following reaction:

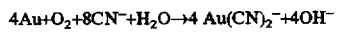

In modern cyanidation circuits, the dissolved gold is typically adsorbed onto particles of activated carbon, either during the cyanide leach itself by carbon-in-leach (CIL) or following the leach by carbon-in-pulp (CIP). An alternate method of recovering gold from cyanide leach solutions is through zinc cementation and variations of the Merrill-Crowe process.

In addition to the locking of gold particles in sulfide minerals, a problem which must be addressed in the treatment of some ores is preg robbing. In carbonaceous ores, preg robbing occurs as active carbon indigenous to the ore has the ability to rob gold from the cyanide bearing leach solution, reducing recovery. Pressure oxidation can partially deactivate the indigenous carbon, but by itself is not sufficient for highly preg-robbing ores. To further reduce preg-robbing problems, blanking agents such as kerosene or sodium lauryl sulfate have been used to further deactivate carbon in the ore. Carbon-in-leach has been successful for mildly preg-robbing ores, as the activated carbon added to the slurry possesses adsorption kinetic characteristics superior to those of the indigenous carbon, allowing the gold to load onto the added carbon as soon as it is leached, before it can load onto the carbon in the ore. Carbon-in-leach alone, however, has not been completely successful in treating highly preg-robbing ores.

An additional problem in recovering gold from highly carbonaceous ores is that a significant quantity of the gold may have been adsorbed onto carbon during formation of the mineral deposit. This gold will only become available to a lixiviant which can remove it from the carbon. The use of a cyanide lixiviant alone has not been entirely successful in leaching gold locked in carbonaceous material.

Ball et al., U.S. Pat. No. 4,902,345, disclose treating refractory carbonaceous and sulfidic ores by thiourea leaching in the presence of carbon rather than cyanide leaching. Kerley, Jr., U.S. Pat. Nos. 4,269,622 and 4,369,061, disclose using an ammonium thiosulfate leach solution containing copper to leach gold and silver from ores containing manganese. Perez et al., U.S. Pat. No. 4,654,078, disclose leaching gold and silver with a copper-ammonium thiosulfate lixiviant to produce a pregnant leach solution. Gold and silver are then precipitated onto a copper cement added to the pregnant leach solution. Wan et al., U.S. Pat. No. 5,354,359, disclose leaching gold from preg-robbing ores with a thiosulfate lixiviant followed by cementation or precipitation of the leached precious metal values. PCT application WO 91/11539 discloses recovering gold from a gold-loaded thiosulfate solution by adding cyanide to form a gold cyanide complex followed by adsorbing the gold cyanide complex onto a carbon or resin adsorbent.

SUMMARY OF THE INVENTION

Among the several objects of the invention, therefore, is the provision of a process for recovering gold from ores in which gold is locked in refractory sulfidic and carbonaceous material. Another object is the provision of such a process which overcomes preg-robbing problems associated with highly carbonaceous ores. Another object is the provision of a process for recovering gold from thiosulfate lixiviant solutions. A further object is the provision of such a process characterized by reduced capital costs, reduced reagent consumption, and environmental compatibility.

Briefly, therefore, the invention is directed to a process for recovering gold from a slurry comprising a solid ore residue and a gold-bearing thiosulfate lixiviant, or from a gold-bearing lixiviant. The slurry or lixiviant is contacted with an ion exchange resin having affinity for gold to adsorb gold from the gold-bearing lixiviant onto the resin. Gold is eluted from the resin to produce a gold-bearing eluate, and gold is recovered from the gold-bearing eluate.

The invention is also directed to a process for recovering gold and copper from a slurry comprising a solid ore residue and a gold-bearing, copper-bearing thiosulfate lixiviant, or from such a lixiviant in the absence of the ore residue. The slurry or lixiviant is contacted with an ion exchange resin having affinity for gold and copper to adsorb gold and copper from the lixiviant onto the resin. Copper is eluted from the resin to produce a copper-bearing eluate; and gold is eluted from the resin to produce a gold-bearing eluate.

The invention is also directed to a process for recovering gold from a gold-bearing pressure oxidized ore slurry in which pressure oxidized ore slurry is contacted with a thiosulfate lixiviant in the presence of an ion exchange resin having affinity for gold to leach gold from the ore and adsorb gold onto the resin. Gold is eluted from the resin to produce a gold-bearing eluate and gold is recovered from the gold-bearing eluate.

Further, the invention is directed to a process for recovering gold from a refractory sulfidic and/or refractory carbonaceous auriferous ore having preg-robbing characteristics due to the presence of organic carbon. An aqueous ore slurry is subjected to pressure oxidation in an autoclave under neutral or alkaline conditions to produce an oxidized ore slurry. Gold is leached by mixing the oxidized ore slurry with a lixiviant comprising a thiosulfate salt to produce a leached slurry comprising a solid residue and a gold-bearing leachate. The slurry is contacted with an ion exchange resin having affinity for gold to adsorb gold from the gold-bearing lixiviant onto the resin. Gold is eluted from the resin to produce a gold-bearing eluate; and gold is recovered from the gold-bearing eluate.

Still further, the invention is directed to a process for recovering gold from a refractory sulfidic and refractory carbonaceous auriferous ore having preg-robbing characteristics due to the presence of organic carbon in which gold is leached from an oxidized slurry using a thiosulfate lixiviant at a pH between 7 and 8.7 while agitating the oxidized slurry/lixiviant mixture to produce a leached slurry comprising a solid residue and a gold-bearing leachate, followed by recovery of gold from the gold-bearing leachate.

The invention is also directed to a process for recovering gold in which an ore slurry is subjected to pressure oxidation in an autoclave under neutral or alkaline conditions to produce an oxidized ore slurry having a pH in the range of between about 6 and 8. The oxidized ore slurry is mixed with a lixiviant comprising a thiosulfate salt. Gold is leached from the oxidized slurry by maintaining the mixture at a pH between 7 and 8.7 to produce a leached slurry comprising a solid residue and a gold-bearing leachate; and gold is recovered from the gold-bearing leachate.

Still further, the invention is directed to a process for recovering gold from an auriferous or precious metal ore comprising forming an aqueous ore slurry, subjecting the ore slurry to pressure oxidation in an autoclave to produce an oxidized ore slurry, mixing the oxidized ore slurry with a lixiviant comprising a quantity of thiosulfate salt in a stirred tank reactor system comprising a plurality of agitated leach tanks by progressively transferring the ore slurry from the first of the leach tanks to the last of the leach tanks while introducing a portion of thiosulfate salt separately into each of the agitated leach tanks to produce a leached slurry comprising a solid residue and a gold-bearing leachate, and recovering gold from the gold-bearing leachate.

The invention is also directed to a process for recovering gold from a gold-bearing eluate containing thiosulfate ions and thiocyanate ions comprising adding a basic compound to the eluate to increase the pH of the eluate to between about 9.5 and about 11.5 to cause gold to precipitate.

Other objects and features of the invention will be in part apparent and in part pointed out hereinafter.

DETAILED DESCRIPTION OF THE INVENTION

The present invention provides an improved process for recovery of gold from a wide variety of ores, and has been found to be especially effective for recovery of gold from refractory sulfidic and/or carbonaceous ores, including relatively lean ores containing as low as 0.065 oz Au per ton. The process is effective for recovery of gold from ores such as those found at the Barrick Gold Goldstrike property in Nevada, which are sulfidic, carbonaceous, and contain iron, arsenic and other heavy metals. In accordance with one embodiment of the process, the various constituents are oxidized under acidic conditions in a pressure oxidation operation in which sulfuric acid is generated, the sulfuric acid is neutralized and oxides and salts are precipitated in a neutralization operation and gold is recovered from the oxidized and neutralized slurry. Preferably, the neutralized slurry is subjected to leaching with ammonium thiosulfate, followed by recovery of gold. In another embodiment of the process, the various constituents are pressure oxidized under neutral or alkaline conditions, and the pressure oxidized slurry is subjected to leaching with ammonium thiosulfate, followed by recovery of gold.

Figure 1:
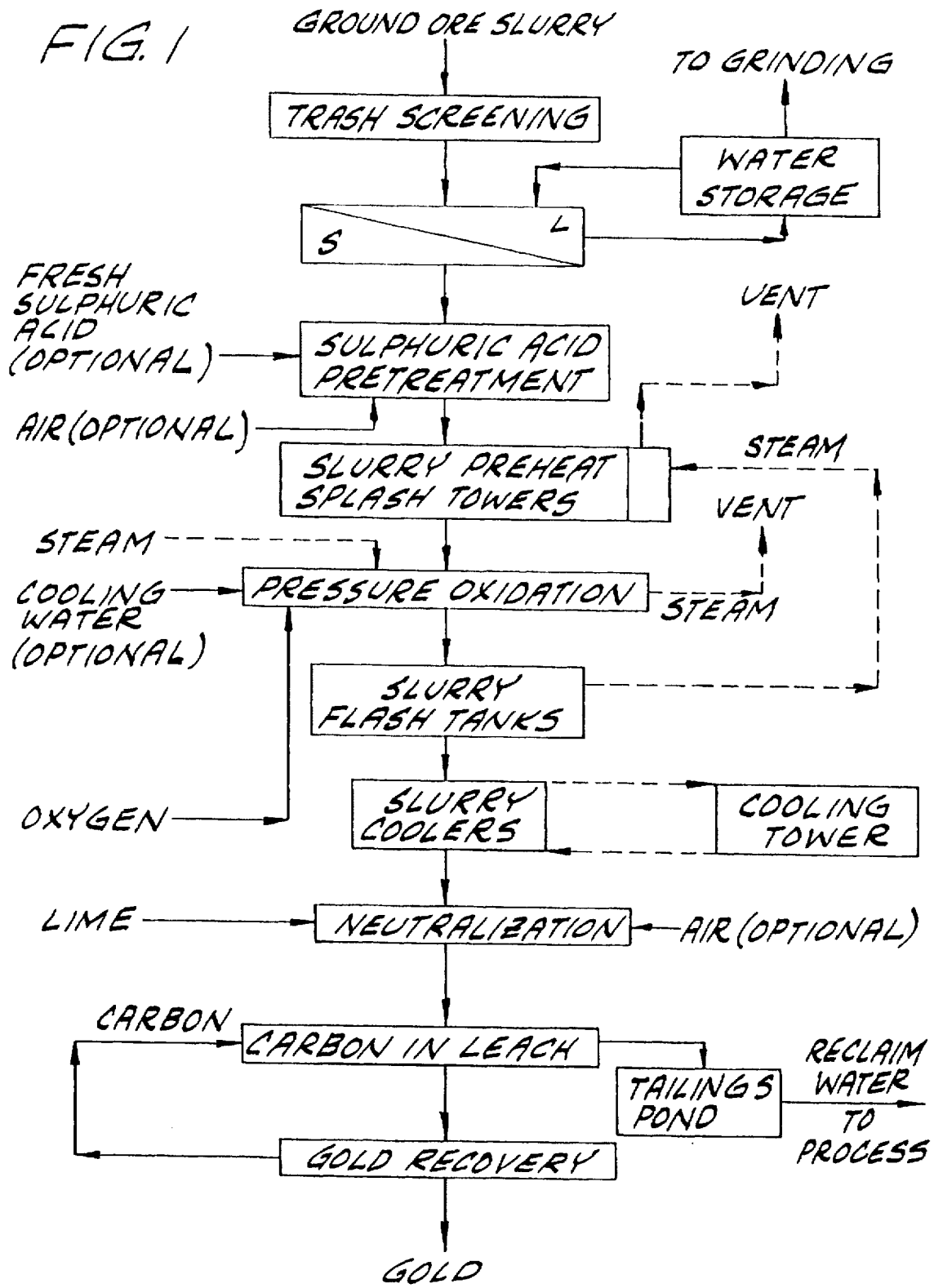
FIG. 1 is a flowsheet of the overall process of one embodiment of the invention.

Illustrated in FIG. 1 is a preferred process of the invention. According to the process of this flowsheet, the ore is crushed and wet milled, and the ground ore slurry is screened for trash or tramp material. Next the ground ore is thickened by removal of excess water in a solid-liquid separation operation.

Depending on the ore, it is in some instances desirable to acidulate the ore with sulfuric acid to neutralize all or part of the carbonate. Depending on the carbonate content of the ore, acidulation may be required continuously to a varying degree or may only be required during start-up. For other ores, the carbonate content is sufficiently high that it is uneconomical to acidulate the ore prior to pressure oxidation, and the carbonate is tolerated without acidulation.

In a first embodiment, the ore slurry is subjected to pressure oxidation in an autoclave in the presence of sulfuric acid using oxygen gas at elevated pressure. Although the ore may be processed in the autoclave on a batch or a continuous basis, treatment on a continuous basis is preferred. A single, multi-compartmented autoclave is preferred but multiple separate autoclave vessels may be used. References herein to "autoclave" and "compartments" encompass a single, multi-compartmented autoclave as well as an autoclave system comprising multiple, separate, autoclave vessels. Sulfide sulfur is oxidized in the autoclave, thereby releasing gold from the refractory sulfide matrix within which it is embedded. It is sometimes necessary to introduce sulfuric acid into the autoclave feed in order to promote rapid oxidation of sulfide sulfur in the ore and achieve maximum release of the gold entrapped in the sulfide. Sulfuric acid is produced in situ as the oxidation proceeds, but an outside source of acid may be necessary to initiate the reaction and achieve adequate productivity. An excess of sulfuric acid is maintained during oxidation in order to promote substantially complete oxidation and ensure that the gold-entrapping sulfide sulfur content of the oxidized slurry is reduced to a practical minimum so as to minimize the amount of gold ending up in the leach tailings. However, the amount of excess acid is controlled since excess acid must be neutralized prior to leaching. The concentration of excess acid, expressed in grams of acid per liter of solution, is preferably less than about 25 grams per liter (gpl), more preferably less than about 10 gpl, and most preferably between about 5 and 10 gpl. By controlling the amount of excess sulfuric acid in the oxidized slurry, not only is there a reduction in the amount of lime used and the quantity of salts generated, but the equipment ancillary to the autoclave can be manufactured from less costly materials of construction. For example, items of equipment, piping, valves and the like can be constructed of lower grade alloys instead of costlier, more acid-resistant materials as has been the prior practice.

In an alternative embodiment of the process of the invention, pressure oxidation is carried out under neutral or alkaline conditions. Although many auriferous ores are not rendered sufficiently amenable to gold recovery by alkaline pressure oxidation, for those ores for which this alternative procedure is feasible, savings in sulfuric acid use and neutralization operation costs are among the advantages achieved. Neutral or alkaline conditions are imparted by alkaline material indigenous to the ore, such as carbonates, and/or by added alkaline material, such as lime, sodium carbonate, or sodium hydroxide. In one preferred embodiment, between about 5 and about 10 kg sodium carbonate per ton of ore is added to the slurry.

In practice, the amount of sulfide sulfur which must be oxidized depends on the nature of the sulfides present and the distribution of the gold in the various sulfides. Typically, oxidation of 50% to over 95% of the sulfide sulfur is advantageously practiced.

Energy from the exothermic pressure oxidation is recovered by heat exchange between the oxidized slurry and feed to the autoclave. As indicated in FIG. 1, this heat exchange is preferably effected by letting down the pressure of the oxidized slurry and using the steam which is flashed from the oxidized slurry to heat the autoclave feed, preferably by direct contact in splash condensers positioned ahead of the autoclave.

After the oxidized slurry is partially cooled by flashing of steam, it is further cooled and then passed directly to a neutralization operation. Although an intermediate washing and/or liquids-solid separation step may be employed, direct neutralization after cooling is preferred to minimize capital costs. Here lime and/or other base is added to increase the pH and render the slurry amenable to subsequent leaching.

Figure 2:
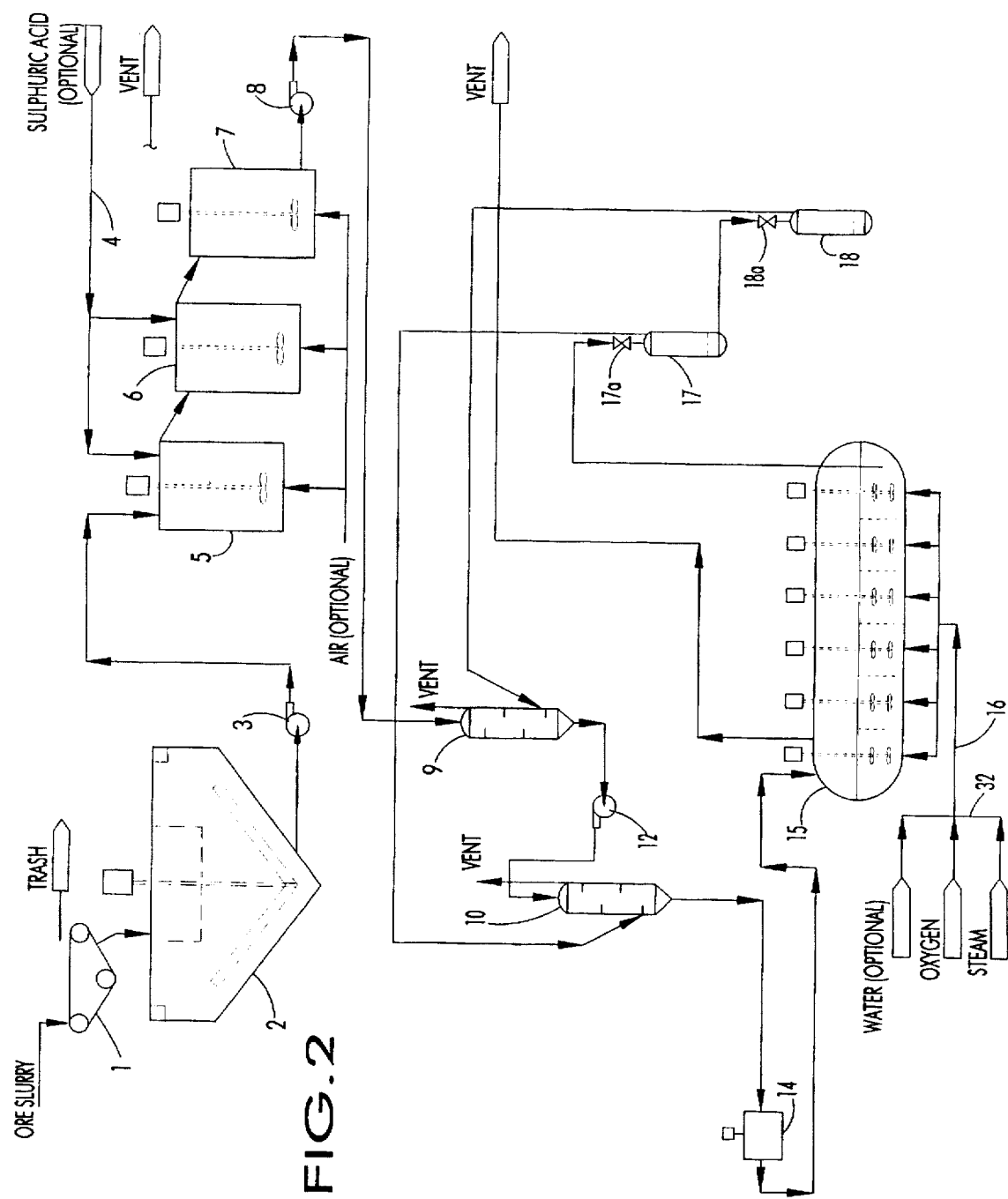
FIG. 2 is a more detailed flowsheet of the embodiment of the invention illustrated in FIG. 1.

Referring to FIG. 2, a particularly preferred embodiment of the invention will be described in detail. Ground ore slurry, a substantial fraction of which, for example 65–95% or more by weight, passes 200 mesh, is directed to a trash screen 1 where rock, wood fiber, trash and plastic larger than 30 mesh are separated and removed. The ore slurry passing through the screen is directed to a mechanical thickening device 2, typically a vertical tank of large diameter which provides a net vertical flow low enough to permit sedimentation of the solid particles. In the thickener, the concentration of the ore slurry is increased from a range of about 10–25% by weight solids to a range of about 40–55%, preferably 50–55%, by weight solids to minimize autoclave size and therefore capital costs. To promote separation of solids, a flocculant is preferably added to the thickener, for example, the polymeric flocculant sold under the trade designation Percol 351 or Superfloc 216, at a dosage of about 0.05 to about 0.2 pounds per ton of ore and at a concentration of about 0.01% to about 2% by weight into the thickener feed. Overflow from the thickener is recycled to the grinding circuit. Thickened ore slurry underflow from the thickener is directed by a transfer pump 3 to a series of stirred acidulation tanks 5, 6 and 7, through which the slurry passes continuously. A fresh sulfuric acid stream (optional) 4 is added to the acidulation tanks in order to release carbon dioxide from the carbonate contained in the slurry, and thereby reduce the equivalent carbon dioxide levels in the ore. Whereas the ore fed to the optional acidulation operation may typically contain up to about 10% $CO_3$, the feed to the autoclave, if acidulation is practiced, preferably contains no more than about 3% $CO_3$. To promote removal of $CO_2$, compressed air may be sparged into the acidulation tanks.

Slurry leaving the acidulation tanks or, if acidulation is not practiced, leaving the thickener, having an adjusted solids content of at least about 30%, preferably about 40–55%, optimum of 50–55% by weight, is fed by a transfer pump 8 to the first of a series of brick lined splash condensers 9, 10 and 11, in which the treated feed slurry for the pressure oxidation step is preheated by contact with steam flashed from the oxidized slurry leaving the pressure oxidation. The successive splash condensers are each, preferably, internally baffled to promote contact between steam and liquid, and are respectively operated at progressively higher pressure and temperature. Centrifugal pumps are interposed to increase the pressure of the slurry between condensers, pump 12 transferring the slurry from condenser 9 to condenser 10, and pumps 13 transferring the slurry from condenser 10 to condenser 11. Preferably, condenser 9 is operated at about atmospheric pressure, condenser 10 is operated at a medium pressure, and condenser 11 is operated under a higher steam pressure. Addition of live steam to the slurry leaving the last splash condenser may be indicated for bringing the slurry to a temperature of at least about 175°–180° C., at which the exothermic pressure oxidation reactions are proceeding at a high rate.

A further process option is the addition of between about 50 and about 200 ppm chloride, preferably about 100 ppm chloride, to the autoclave feed in the form of a chloride salt such as sodium chloride. The chloride is believed to increase the kinetics of the sulfide oxidation reaction.

Pressure oxidation is carried out in an autoclave 15, having a number of segmented, agitated compartments, preferably multi-lined, the last lining being brick, to which the slurry is transferred, preferably by a positive displacement diaphragm pump 14, from the last splash condenser 11. The compartments of the autoclave are preferably of substantially equal volume. Due to the rounded or dished ends of the first and last autoclave compartments, however, these compartments are often slightly larger. Although the first compartment may be slightly larger than the intermediate compartments, the volume of slurry in the first compartment during pressure oxidation is not greater than about 1.3 times, often not greater than 1.2 times, the volume of slurry in any one of the successive compartments.

In the autoclave, the slurry is passed through the plurality of compartments at a rate which provides a total retention time on the order of 30–100 minutes, and is contacted in the presence of sulfuric acid with oxygen gas at a temperature of between about 185° and about 235° C., an oxygen partial pressure of at least about 20 psi and a total pressure of between about 400 and about 500 psia. Preferably, the temperature of the pressure oxidation is controlled at a level no higher than about 235° C. Temperature is controlled by a variety of means, including venting tailgas from the autoclave, venting steam, as from the last splash condenser tank 11 of FIG. 2, and/or injecting cold water directly into the autoclave compartments. In the embodiment of the process involving acidulation of the ore and/or oxidation under acidic conditions, the final acidity of the slurry leaving the last compartment of the autoclave is between 5 and 30 grams sulfuric acid per liter of solution. In the embodiment of the process involving pressure oxidation under neutral or alkaline conditions, the pH of the slurry leaving the last compartment of the autoclave is between about 6 and 8.

In both the acidic pressure oxidation process and neutral/alkaline pressure oxidation process, oxygen is introduced to each compartment by way of sparge pipes, which extend from the top of the autoclave, down along the autoclave wall, and to a position underneath the agitators. Oxygen is flowed through the sparge pipes and injected into the slurry beneath the agitator in each compartment. A rotameter for each compartment monitors the flow of oxygen thereto and associated valves are used to control such flow, manually or automatically. Oxygen flow to the various compartments is controlled and, if desired, oxygen utilization can be controlled as described in commonly assigned U.S. Pat. No. 5,489,326, the entire disclosure of which is expressly incorporated herein by reference. In accordance with this method, it has been discovered that increased oxygen utilization can be achieved without sacrificing gold recovery.

Oxidation of the sulfides in the ore, the vast majority of which are iron sulfides, is believed to occur primarily in accordance with the following two reactions:

(1) $2\ FeS_2 + 7\ O_2 + 2\ H_2O \rightarrow 2\ FeSO_4 + 2\ H_2SO_4$ (2) $2\ FeS_2 + 7.5\ O_2 + 7\ H_2O \rightarrow Fe_2O_3 \cdot 3\ H_2O + 4\ H_2SO_4$.

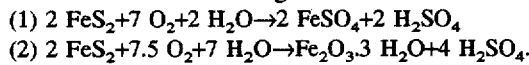

Stoichiometrically these equations dictate that between 1.75 [7/4] and 1.875 [7.5/4] moles $O_2$ are required to oxidize each mole $S^=$. In the Goldstrike ore the vast majority of sulfides which must be oxidized are the gold-occluding sulfidic minerals pyrite and marcasite.

Continuing the gold recovery process as shown in FIG. 2, noncondensables and steam generated during the pressure oxidation operation are vented optionally through a cyclone 23 which separates entrained solids for return to the autoclave. Oxidized slurry leaving the autoclave is passed to a series of flash tanks 17, 18, and 19, through control valves 17a, 18a, and 19a, respectively, where steam is flashed off to cool the slurry. Steam from each flash tank is recycled and contacted with autoclave feed slurry in a complementary splash condenser, operated at substantially the same pressure as the flash tank, for preheating the feed slurry. Thus, in the series as illustrated in FIG. 2, the first flash tank 17 is coupled to the last splash condenser 11, the second flash tank 18 is coupled with the second condenser 10, and the last flash tank 19 is coupled with the first splash condenser 9. Typically, between 1 and 3 flash tanks and between 0 and 3 condensers are employed. The preferred embodiment employs two flash tanks and two splash condensers.

Steam leaving each of flash tanks 17, 18 and 19 is optionally passed through a cyclone 20, 21 and 22, respectively, for recovery of entrained solids. An alternative to using cyclones is to use larger diameter flash tanks, reducing the number of items of equipment thereby simplifying maintenance and operations. The recovered solids are blended back into the oxidized slurry.

Figure 3:
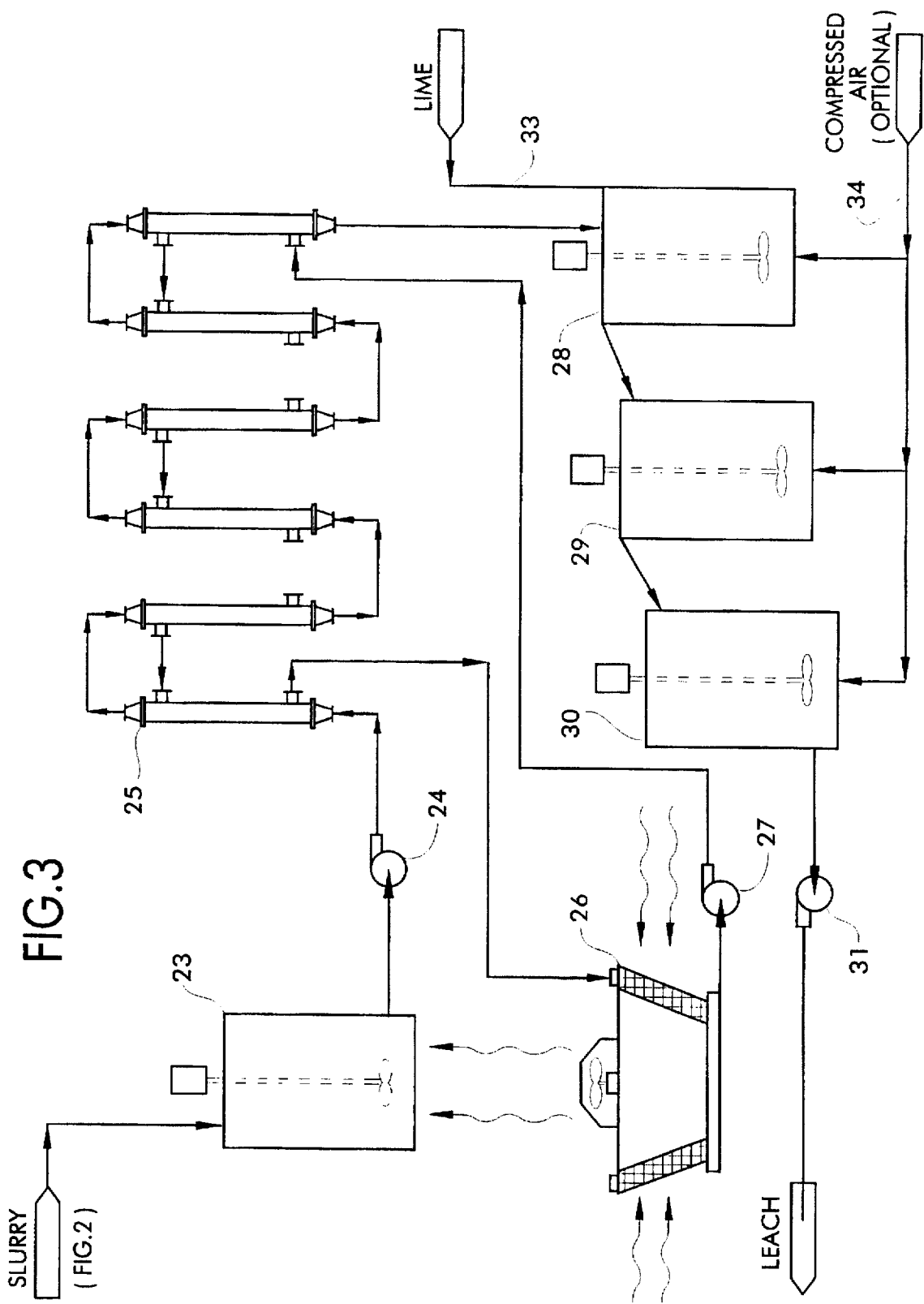
FIG. 3 is a more detailed flowsheet illustrating the cooling and neutralization steps in a preferred embodiment of the invention.

Referring to FIG. 3, hot oxidized slurry from the autoclave flash tank 19, having a solids content of at least about 30% by weight, preferably at least about 35% by weight, and containing soluble sulfates, iron salts, arsenates, etc., is transferred to an intermediate agitated storage tank 23. In order to condition the slurry for gold recovery operations, the temperature of the hot oxidized slurry is reduced to between about 90° F. and about 140° F., preferably between about 110° F. and about 130° F., more preferably below about 120° F. by passing the slurry, by means of pump 24, through a series of shell and tube coolers 25. The temperature of the slurry is reduced by exchanging heat from the slurry to a cooling water stream. Cooling water is obtained from a recirculating system in which the water is recycled through a crossflow, induced draft cooling tower 26 by pump 27.

Cooled oxidized slurry which is discharged from the coolers 25 is fed continuously through a series of rubber or epoxy lined agitated neutralization tanks 28, 29 and 30. In accordance with the process described in U.S. Pat. No. 5,071,477, the entire disclosure of which is expressly incorporated herein by reference, the cooled oxidized slurry may be directly neutralized without either washing the slurry or separating solids therefrom prior to neutralization. By omitting any washing operation between the autoclave and the neutralization operation, as is preferred but not required, the volume of materials handled is reduced and the need for other ancillary operations such as wash water recovery is avoided.

The autoclave conditions and means for recovery of exothermic reaction heat provide not only efficient gold recovery but efficient use of energy. In another embodiment (not shown) the transfer of heat from the oxidized slurry to the slurry autoclave feed can be accomplished by indirect heat exchange rather than by coupled flash tanks and splash condensers. In that embodiment the indirect heat exchanger is preferably a double pipe exchanger in which the inner pipe is constructed of an acid resistant metal or alloy and the outer pipe of steel. The oxidized slurry is passed through the interior pipe and the relatively cold pressure oxidation feed slurry is passed through the annular space between the pipes. The interior pipe of the heat exchanger, which is in contact with the highly acidic streams leaving the autoclave need not be constructed from titanium as generally has been the practice. Instead, alloy 20 or other similar acid resistant alloy can be used, thereby significantly lowering the cost of the heat exchanger.

In both of the alternatives described above for cooling the slurry, it is important that the cooling/heat exchange occur prior to the neutralization and leaching reagent addition operations described below. If the slurry is not at a temperature below about 150° F., preferably below about 140° F., more preferably below about 130° F., the loss of the various reagents to volatilization or degradation would render the process economically infeasible.

In the neutralization operation the slurry is neutralized with a slurry of lime and/or other base to raise its pH to preferably between 7 and 8.7, more preferably to about 7.5–7.7. Lime is highly preferred but the neutralization may be carried out with other bases which form sulfate salts on reaction with sulfuric acid and are capable of raising the pH to a level at which iron and arsenate salts are precipitated. Compressed air 34 is optionally sparged into the slurry in the neutralization tanks to convert ferrous iron to ferric iron. The neutralized slurry, having a solids content of 30–40% by weight and a temperature of about 75°–95° F., is then directed to a thiosulfate leach operation by transfer pump 31.

Figure 4:
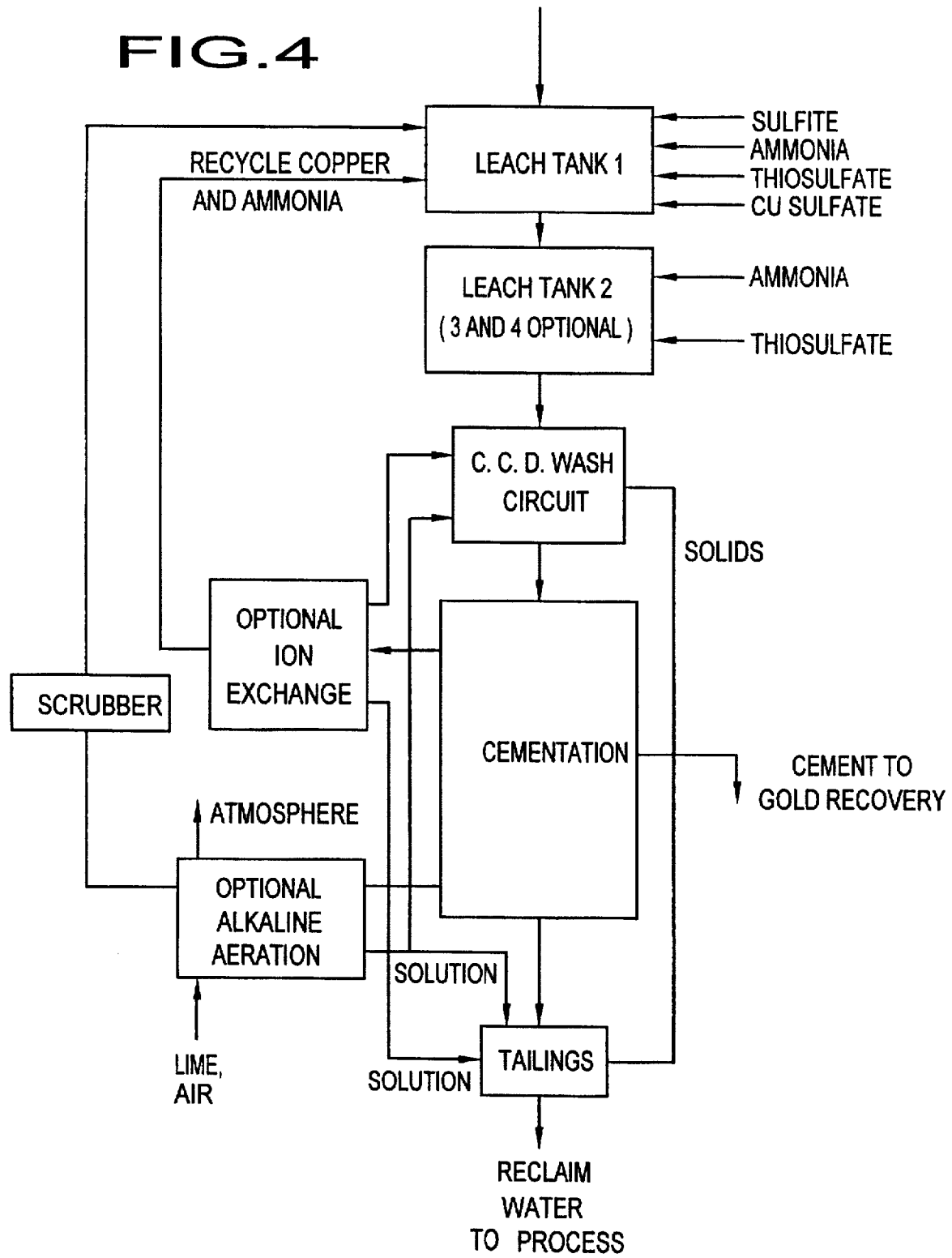
FIGS. 4 and 5 are flowsheets illustrating alternative embodiments of the leaching operations and gold recovery of the invention.

Following neutralization the ore slurry is passed to one or more leach tanks where thiosulfate lixiviant is added as shown in FIG. 4. The preferred lixiviant is ammonium thiosulfate solution having between about 0.01M and 0.1M thiosulfate ion, more preferably about 0.03 to about 0.05M thiosulfate ion, most preferably about 0.04M thiosulfate ion. Alternative embodiments employ other soluble thiosulfate salts, such as calcium thiosulfate or sodium thiosulfate, having the same thiosulfate ion concentrations, rather than ammonium thiosulfate. Leaching is performed in a stirred tank reactor system on a batch or continuous basis. In continuous mode, the stirred tank reactor system preferably comprises from one to six stages of mechanically agitated tanks arranged in series so that slurry flow cascades from one tank to the next by gravity. The leaching of gold is accomplished by oxidation of metallic gold and complexing with thiosulfate to form the $Au(S_2O_3)_2^{3-}$ complex according to the following reaction:

$$2Au + \tfrac{1}{2}O_2 + 4S_2O_3^{2-} + H_2O \rightarrow 2Au(S_2O_3)_2^{3-} + 2OH^-$$

The slurry flowing through the leach tanks is between about 30 and 45% solids, preferably about 40% solids. A temperature of between about 25° C. and 60° C., preferably between about 45° C. and 60° C., most preferably between about 45° C. and 55° C., is maintained throughout leaching to promote rapid dissolution of gold to form the soluble $Au(S_2O_3)_2^{3-}$ complex. Higher temperatures in this range have been found to accelerate leaching, but the temperature should be maintained below 60° C. to avoid degradation of reagents and damage to the ion exchange resin.

In addition to thiosulfate, the lixiviant solution contains a catalyst, preferably cupric ion, to promote oxidation of the gold and subsequent solubilization as the thiosulfate complex. The cupric ion may be chemically reduced through reaction with thiosulfate, sulfite or gold.

$$2Cu^{2+} + 8S_2O_3^{2-} \rightarrow 2Cu(S_2O_3)_3^{5-} + S_4O_6^{2-}$$

$$2Cu^{2+} + SO_3^{2-} + H_2O + 6S_2O_3^{2-} \rightarrow 2Cu(S_2O_3)_3^{5-} + SO_4^{2-} + 2H^+$$

$$2Cu^{2+} + 2Au + 10S_2O_3^{2-} \rightarrow 2Cu(S_2O_3)_3^{5-} + 2Au(S_2O_3)_2^{3-}$$

The cupric ion is thought to exist in ammoniacal solution as the cupric tetrammine ($Cu(NH_3)_4^{2+}$) and the above equations can be modified to include this species. The gold leaching reaction is the desired reaction. The oxidation of thiosulfate is generally to be regarded as undesirable although it may be possible for the tetrathionate ($S_4O_6^{2-}$) to behave as an oxidant toward gold. Sulfite has the role of a sacrificial reductant and reduces the rate of thiosulfate oxidation. Oxygen may react with the gold directly or it may react with cuprous thiosulfate species to form a cupric tetrammine species which subsequently oxidizes gold.
Direct Reaction:

$$O_2 + 4Au + 8S_2O_3^{2-} + 2H_2O \rightarrow 4Au(S_2O_3)_2^{3-} + 4OH^-$$

Catalytic Mechanism:
Step 1, Cuprous oxidation by oxygen:

$$O_2 + 4Cu(S_2O_3)_3^{5-} + 16NH_3 + 2H_2O \rightarrow 4Cu(NH_3)_4^{2+} + 12S_2O_3^{2-} + 4OH^-$$

Step 2, Cupric leaching of gold:

$$4Cu(NH_3)_4^{2+} + 4Au + 20S_2O_3^{2-} \rightarrow 4Cu(S_2O_3)_3^{5-} + 4Au(S_2O_3)_2^{3-} + 16NH_3 +$$

Step 3, Overall:

$$O_2 + 4Au + 8S_2O_3^{2-} + 2H_2O \rightarrow 4Au(S_2O_3)_2^{3-} + 4OH^-$$

It has been discovered that the copper concentration should be maintained in the range of 10–100 ppm and that, if the copper concentration is allowed to drop too low, gold recovery suffers. Copper is maintained in solution by the addition of ammonia in an amount sufficient to ensure a minimum molar ratio of 4:1 $NH_3$:Cu, preferably with about 10% excess ammonia, to form the stable copper amine, tetrammine copper sulfate.

In order to minimize losses of ammonia, and minimize precipitation of gold and copper associated with such losses, the pH during the leaching operation is maintained in the range of 7 to 8.7, most preferably about 7.5–7.7. Under the agitated leach conditions of the invention, it has been discovered that at higher pH than that of the invention, notably reduced gold yields result.

As an optional measure to minimize reagent loss and minimize reduction in gold recovery through oxidation of thiosulfate to tetrathionate, trithionate, sulfate, and other oxidized species, a slight excess of sulfite, 0.001M to 0.1M, preferably 0.01M to 0.05M, can be added in the form of sodium metabisulfite or sulfur dioxide. Under oxidizing conditions reagent loss can occur by oxidation of thiosulfate by the following reaction:

$$2(NH_4)_2S_2O_3 + \tfrac{1}{2}O_2 + H_2O \rightarrow (NH_4)_2S_4O_6 + 2NH_4OH$$

Added ammonium sulfite reduces tetrathionate to thiosulfate by the following reaction:

$$(NH_4)_2SO_3 + 2NH_4OH + (NH_4)_2S_4O_6 \rightarrow 2(NH_4)_2S_2O_3 + (NH_4)_2SO_4 + H_2O$$

The thiosulfate equilibrium with sulfite and sulfide is as follows: $6H^+ + 4SO_3^{2-} + 2S^{2-} \rightleftarrows 3S_2O_3^{2-} + 3H_2O$, such that without added sulfite the equilibrium is shifted to the left, which favors the precipitation of gold sulfide. Sulfite addition therefore stabilizes the lixiviant and improves gold recovery.

In one embodiment when from two to four leach tanks are used, copper sulfate, sulfite, ammonia and thiosulfate are added to the first tank and ammonia and thiosulfate are added to tanks two through four. Distribution of the ammonia and thiosulfate among the tanks in this manner has been found to be effective. The ammonia source may be fresh ammonia or recycled ammonia recovered from the slurry or barren leachate after gold recovery.

The slurry containing the gold-bearing lixiviant solution and solid residue is then fed to a gold recovery operation. In the preferred gold recovery operation illustrated in FIG. 6, the gold-bearing lixiviant and solid residue are subjected to resin-in-pulp (RIP) or resin-in-leach (RIL) recovery of both the gold and the copper. One preferred embodiment employs one leach tank followed by six RIP tanks. Between about eighty and one hundred percent of the lixiviant and all of the copper are added to the first tank, i.e., the leach tank, while any remaining lixiviant is added to the following tank having resin in it. A second preferred embodiment differs only in that resin is present in the first tank, i.e., the leach tank, such that it is an RIL system. In this variation of the RIP process, the thiosulfate leaching operation and adsorption onto resin operation are effected simultaneously, such that the thiosulfate lixiviant first contacts the ore slurry in the presence of the resin.

In both the RIP and RIL operations of the invention, the lixiviant and solid residue are contacted with an anion exchange resin, preferably a strong base resin consisting of a quaternary amine attached to a polymer backbone (e.g., polystyrene beads). A strong base resin is preferred over a weak base resin because while a strong base resin's effectiveness is not dependent on environmental pH, a weak base resin typically requires an environmental pH of less than 7. The capacity of a typical strong base resin is also greater than that of a weak base resin, such that a lower volume of resin is required. Furthermore, because strong base resins are more widely used, they are typically more available and economical than weak base resins. Gel resins and macroporous resins are both suitable, with macroporous resins being preferred because they are more durable and because the resin is not subjected to significant variations in pH in this process which, if it were the case, would call for gel resins over macroporous resins. The preferred resin comprises beads of at least about 0.8 mm in average diameter to facilitate screening. Suitable resins include all commercial strong-base resins of either Type I (triethylamine functional groups) or Type II (triethyl ethanolamine functional groups), particularly those that are based on a macroporous matrix of polystyrene, cross-linked with 8–10% divinyl benzene. Specific strong-base ion exchange resins for use in this invention include Dowex M-41 and Dowex MSA-1 (Type I), Dowex M-42 and Dowex MSA-2 (Type II), which are manufactured by Dow Chemical, Amberlite IRA-900C, Amberlite IRA-904 (Type I), and Amberlite IRA-910 (Type II), which are manufactured by Rohm & Haas. Also satisfactory are the Lewatit M-600 resins, MP 500, which is manufactured by Bayer, and the gel-type resin 21K, manufactured by Dow Chemical. A suitable weak-base resin is A7, available from Rohm & Haas.

The RIP operation is carried out in a stirred tank reactor vessel or, preferably, in a Pachuca tank, that being an air-agitated, conical-bottom, solid-liquid mixing vessel in which the air is injected into the bottom of the cone. An advantage of the Pachuca system is reduced resin bead breakage and improved dispersion of the resin beads in the slurry as compared to mechanically agitated systems. The RIP recovery is preferably carried out in four or more, more preferably between four and eight such Pachuca tanks connected in series. The total residence time of the pulp is up to about twelve hours, with about 60 minutes per stage preferred. In one preferred embodiment the resin is moved from stage to stage countercurrently to the pulp at a rate such that the retention time of the resin is about two to three hours per stage. One particularly preferred embodiment employs just one thiosulfate leach tank, which is an exception to the multi-stage system described above, followed by six successive RIP tanks.

As compared to prior processes in which the gold-bearing thiosulfate lixiviant is recovered from the solid residue by liquid/solid separation before recovery of gold therefrom, we have discovered there to be a distinct advantage in recovering the gold therefrom with the solid residue still present. During thiosulfate leaching, a quantity of gold has a tendency to deposit back onto indigenous carbon of the ore in the slurry. Such redeposited gold is removed with the solids at the traditional liquid/solid separation stage. But by contacting the resin with the pregnant lixiviant while the ore slurry solids are still present, it appears that the present process has improved recovery as the resin adsorbs even a quantity of the gold which had redeposited onto the carbon in slurry solids. Furthermore, the resin seems to have stabilized the system and resulted in a significant reduction in the degradation of the gold-thiosulfate complex and the thiosulfate reagent. There is therefore an appreciable advantage in thiosulfate leaching in the presence of the resin, or at least having the resin present shortly after thiosulfate leaching, and in maintaining the pulp present when adsorbing gold from the lixiviant onto the resin permitting further leaching of gold.

A further alternative of the invention employs a liquid/solid separation stage followed by contact of the pregnant lixiviant, in the absence of ore slurry solids, with an ion exchange resin as described above. The pregnant lixiviant is preferably brought into contact with the resin as soon after thiosulfate leaching as possible. The loaded resin is then processed as described below.

Figure 6:
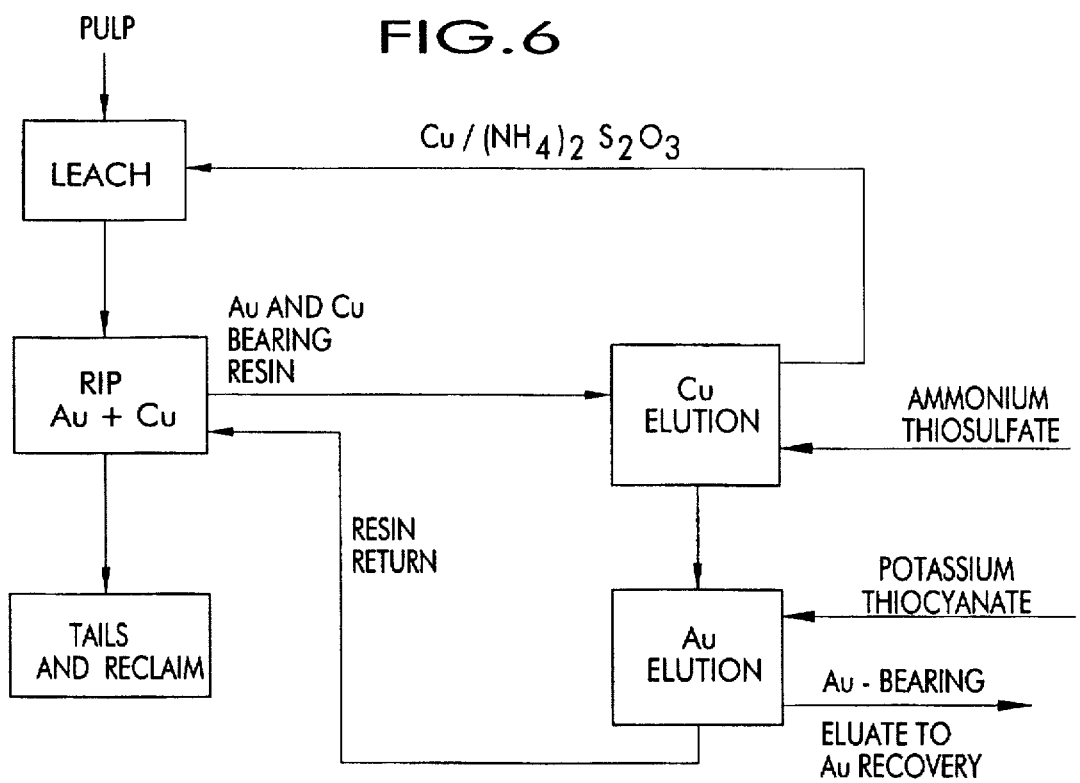
FIG. 6 is a flowsheet showing the resin-in-pulp and elution stages of the invention.

The pulp and barren lixiviant exiting the final RIP stage are sent to tailings for optional further treatment and reclaim, as shown in FIG. 6. The loaded resin is sent to an elution stage shown in FIG. 6 for elution of copper and gold therefrom. Copper is eluted from the loaded resin by washing with ammonia salts or a mixture thereof, such as a mixture of ammonium hydroxide and ammonium sulfate, or of ammonium hydroxide and ammonium thiosulfate. A 100–200 g/l ammonium thiosulfate solution has been found to be especially effective for copper elution. The eluate containing ammonium thiosulphate and between about 500 and 1500 ppm copper is then recycled to the leaching operation.

After copper elution, a thiocyanate solution, such as a 100–200 g/L potassium thiocyanate solution, is a preferred eluant for eluting gold from the resin in the gold elution step shown in FIG. 6. Ammonium thiocyanate is an optional gold eluant, and is effective since at this point in the process the copper has already been eluted. Sodium thiocyante or calcium thiocyanate are also effective eluants. The eluate is passed directly to a gold recovery operation.

Figure 7:
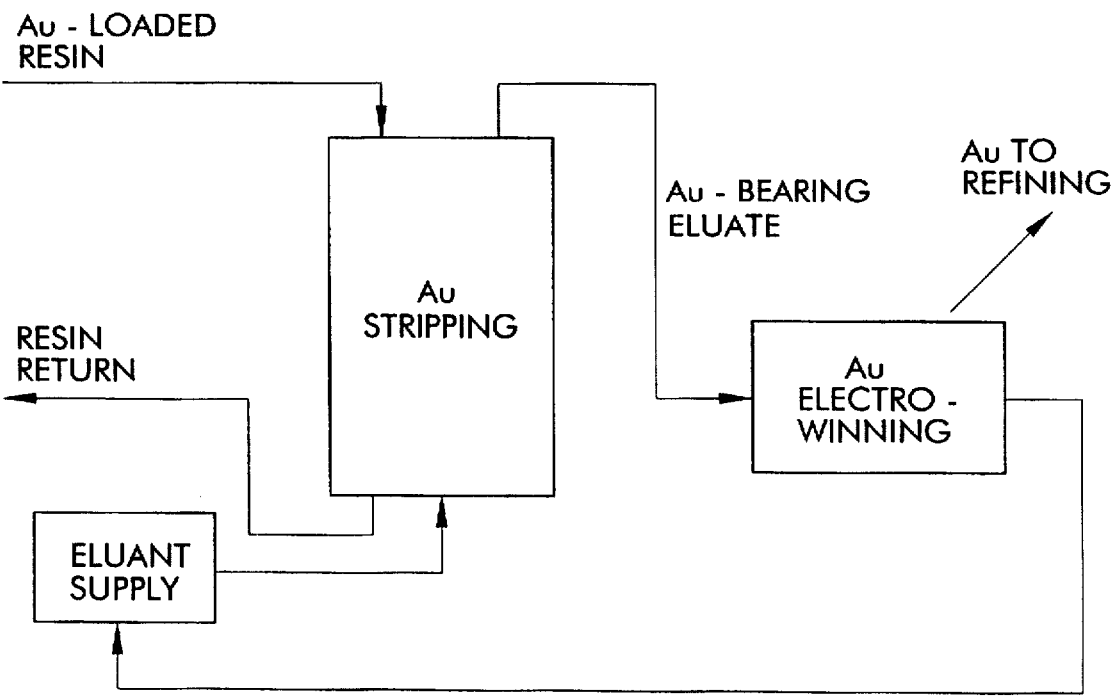
FIG. 7 is a flowsheet showing an electrowinning circuit of the invention.

One preferred gold recovery operation is an electrowinning operation as shown in FIG. 7. The solution passing through the electrowinning operation typically still has some quantity of gold in it which is recovered on subsequent passes through the circuit. The resin is recycled to the RIP operation. Since the reaction at the anode tends to produce cyanide from the oxidation of thiocyanate, a membrane (e.g., Nafion) cell is preferred of the type which is well known in the art for recovering gold from gold/cyanide solutions. The anode is stainless steel or lead, the latter being more resistant to the acid produced in this electrowinning circuit. The gold-stripping/electrowinning circuit operates on a batch, continuous, or semicontinuous basis. The temperature of the eluate and of the entire circuit is preferably in the range of 20°–60° C., as damage to the resin can occur above 60° C. The solution entering the electrowinning circuit typically contains for example, 100–500 ppm Au and 100–200 g/L thiocyanate. A disadvantage of electrowinning is that a tendency for elemental sulfur to precipitate after elution seems to be accelerated by electrowinning, which sulfur tends to interfere with efficient continued operation of the electrowinning circuit.

An especially preferred gold recovery operation is to add lime or caustic to the eluate to increase its pH to between about 9.5 and about 11.5 to cause gold to precipitate, preferably to about 11. At that temperature a gold-bearing precipitate forms. This precipitation operation is preferably accomplished using two to four agitated tanks with a total retention time of about two hours. A reductant such as zinc, copper, aluminum or, preferably, sodium borohydride in a molar ratio of about 2:1 to the amount of gold may then be added to the final of these tanks to promote precipitation of the remaining gold. The eluate is then filtered to yield a gold-bearing filter cake which is smelted to produce gold bullion. The filtrate pH is then adjusted back to about 7 by adding fresh sulfuric or nitric acid, and then recycled for use as eluant.

As an alternative to RIP or RIL recovery, gold is recovered by zinc, copper, aluminum or iron cementation as shown in FIG. 4. The slurry leaving the thiosulfate leaching operation is subjected to a countercurrent decantation (CCD) wash circuit and the solids portion removed as tailings. Zinc, copper or iron powder is added to the pregnant leachate to precipitate gold, and gold is subsequently recovered by refining in furnaces. The barren leachate is sent directly to tailings and/or to an optional ammonia and copper recovery operation as shown in FIG. 4.

A further option in accordance with this invention is to separate the gold-bearing leachate from the solid residue and contact the leachate with cyanide ion to form gold-cyanide complex. The solution containing the gold-cyanide complex is then contacted with an adsorbent column of activated carbon or other adsorbent having an affinity for the gold-cyanide complex.

Another optional operation for gold recovery in accordance with this invention is to separate the gold-bearing leachate from the solid residue and contact the gold-bearing leachate with an adsorbent, such as an ion exchange resin or a solvent extraction reagent, having an affinity for the gold-thiosulfate complex.

Figure 8:
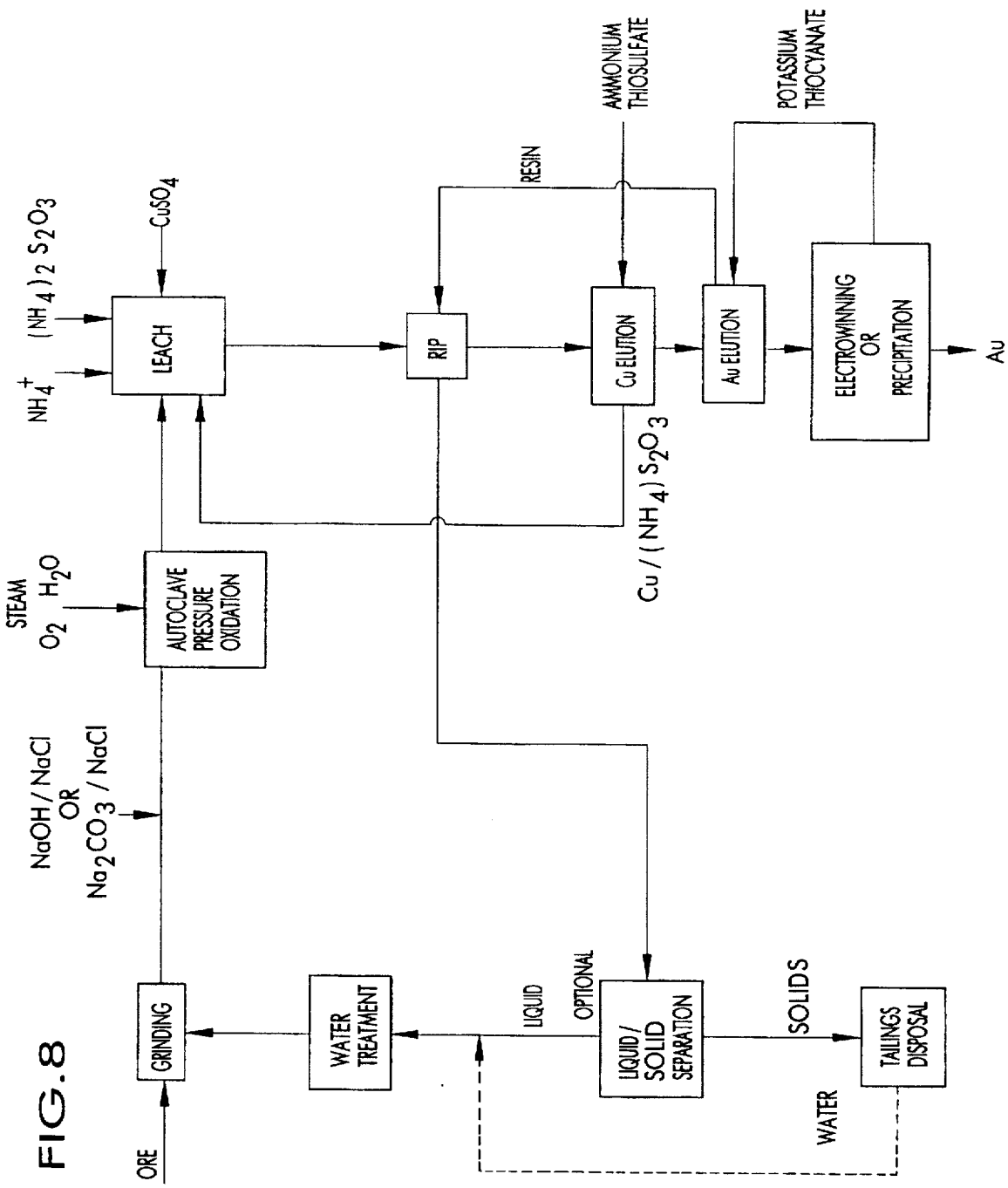
FIG. 8 is a flowsheet showing an especially preferred process in accordance with this invention.

Turning now to FIG. 8, an especially preferred process involving certain of the above-described unit operations is shown. To enhance readability, this FIG. 8 shows only selected major operations, with some of the details of FIGS. 2 and 3 omitted. Ore is ground to a size of about 65–85% passing 200 mesh and thickened to about 40–50% solids as described above in connection with FIG. 3. Sodium carbonate (about 5 kg/ton) is added to ensure that pressure oxidation is carried out under alkaline conditions and Cl (100 ppm) is added to improve kinetics and facilitate oxidation. The ore is pressure oxidized, leaves the autoclave at about 35% solids, and is directed to a leaching operation where it is contacted with ammonium thiosulfate (5 g/L) and copper sulfate (25 ppm Cu). The slurry of gold-bearing leachate and solid residue leaving the leaching operation contains in the range of about 1–5 ppm gold, and is directed to an RIP operation as described in FIG. 6 where gold and copper are loaded onto the resin to about 1000–5000 g/t Au and about 10–25 kg/t Cu. Copper is eluted from the resin using ammonium thiosulfate (200 g/l) and gold is eluted using potassium thiocyanate (200 g/L). The copper-bearing eluate contains about 500–1500 ppm Cu; the gold-bearing eluate contains about 100–500 ppm Au. The eluates are then processed as described above in connection with FIG. 7.

Figure 5:
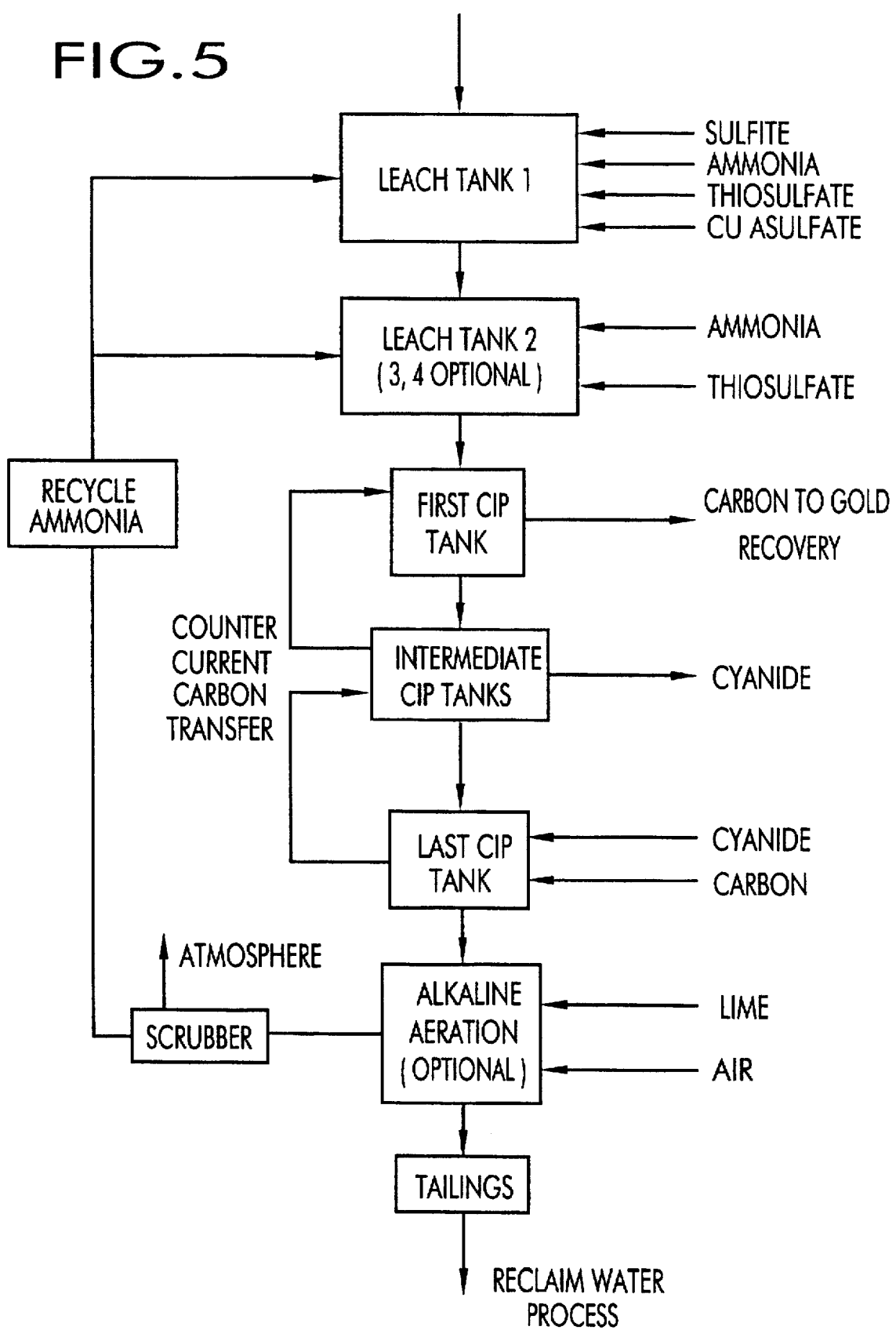

After gold recovery, ammonia is optionally recovered from the barren leachate or slurry. Ammonia is recovered from the slurry by adding a basic compound, preferably lime, to raise the pH to about 10.5 and aerating the slurry to drive off the ammonia as shown in FIG. 5. The ammonia is then scrubbed from the off-gas and recycled to the leach circuit. In a variation of this ammonia recovery process, the slurry is first separated into a solid residue and barren leachate, lime is added to the leachate to raise its pH to about 10.5, and it is aerated to drive off ammonia. The ammonia is then scrubbed from the off-gas and recycled to the leach circuit. The solution is sent to tailings and/or recycled to a CCD wash circuit. In an additional ammonia recovery variation applicable to the process wherein the gold recovery operation involves separation of the slurry into a solid residue and leachate, ammonia is recovered directly from the barren leachate by alkaline aeration (FIG. 4).

Preferably, a liquid/solid separation is performed with the solids discarded and the liquid portion treated and recycled to the ore-grinding operation. Sodium carbonate treatment of the reclaim water facilitates calcium removal, to minimize problems associated with contaminating the ammonia removal system with gypsum. Both ammonia and thiocyanate ions are removed if the water is to be reclaimed and recycled to the grinding operation, because they tend to extract gold in the autoclave, which gold disadvantageously loads onto indigenous carbon in the ore. Ammonia is removed, for example, as described above and thiocyanate is removed by contacting with a weak base resin.

As shown in FIG. 4, a further option for treating the barren leachate is to contact it with an ion exchange resin having an affinity for copper amine to separate the copper amine from the barren leachate. Copper and ammonia are recovered from resin and recycled to the thiosulfate leach operation while the solution is recycled to the CCD wash circuit and/or bled to the tailings.

An advantage to removing the ammonia from the barren leachate is that, as a consequence, copper precipitates out of the barren leachate. Reclaim water can therefore be recycled without dissolved copper. Such reclaim water is suitable for use in a cyanide leach circuit operated in parallel with the thiosulfate leach circuit, since copper, known to interfere with cyanidation, would be minimized.

Further illustration of the invention is provided by the following examples:

EXAMPLE 1

A gold ore containing about 0.19 ounces/ton gold, 1% sulfide sulphur, and 1% graphitic carbon yielded only negligible gold recovery after conventional cyanidation and only about 6% gold recovery after pressure leaching, cyanidation and carbon-in-leach. This ore was processed according to the method of the invention and yielded between about 75 and 85% gold recovery. The ore was pressure leached under alkaline conditions in a continuous autoclave for 60–75 minutes at 210°–225° C. and at an oxygen overpressure of 100 psi. This treatment resulted in oxidation of 70–75% of the sulphides in the ore to sulphate. Alkali was added to the autoclave in the form of soda ash to enhance the rate of sulfide oxidation. The autoclave product was then cooled to about 50° C. and leached with a lixiviant containing ammonium thiosulphate (3–6 g/L) and copper (25 mg/L). The pH of the slurry was 7.5–8.5 exiting the autoclave, and was not adjusted for leaching. About 75% of the gold in the slurry was leached in less than 1 hour. Higher concentrations of copper and ammonium thiosulphate were found to provide only marginal improvement. The gold and copper thiosulphate complexes were extracted from the mixtures of lixiviant and solid residue (Au, 99.5%; Cu, 98%) by a strong base ion exchange resin in 4–6 stages of countercurrent resin-in-leach extraction. Gold loadings of 2–5 kg/ton of resin and copper loadings of 15–25 kg/ton were achieved. Gold extraction improved from about 75% in the leach vessel to abut 80–85% during resin-in-leach. In one particular pilot plant run there was one leach stage followed by six resin stages. The slurry gold concentration at these seven stages was, successively, 1.8, 0.73, 0.35, 0.19, 0.1, 0.5 and 0.3 mg/L. The slurry copper concentration at these seven stagess was, successively, 23.7, 24.8, 47.9, 29.1, 25.8, 9.07, and 1.84 mg/L. The final stage effluent had a thiocyanate concentration of 268 mg/L, an ammonia concentration of 1136 mg/L, a thiosulfate concentration of 3288 mg/L, and an undetectable tetrathionate concentration.

The loaded resin was eluted with 5–6 bed volumes of a strong solution of ammonium thiosulphate (100–200 g/L) at ambient temperature to strip copper and yield a strong copper thiosulphate (0.5–2 g/L Cu)/ammonium thiosulphate solution for recycling to the leaching stage of the process. More than 95% of the copper required to catalyze gold leaching was thus internally recycled, and all of the eluant required to strip copper from the resin was provided by the lixiviant, ammonium thiosulphate. During copper elution, less than 10% of the gold on the resin was also stripped, but this was recycled to the leach and thus was not lost. Copper elution efficiency was greater than 99.9% and the elutions kinetics were fast (2–3 hours). Gold was then eluted from the resin in a second stage of elution, with 5–6 bed volumes of a strong potassium thiocyanate solution (100–200 g/L) at its natural pH of 6–7 and at ambient temperature. Gold elution efficiency was about 90% achieved within 2–3 hours. The gold eluate, which contained 50–250 mg/L gold, was treated by two alternative methods for gold recovery. In the first alternative method, the gold was recovered by electrowinning involving plating at a steel wool cathode (subalternative 1-A), and at a stainless steel cathode (subalternative 1-B), yielding gold bullion containing very little copper (less than 1%). In the second alternative gold recovery method, the pH of the eluate was raised to about 11 with additions of caustic soda (subalternative 2-A), and with additions of lime (subalternative 2-B). Raising the pH in this manner caused formation of a predominantly sulphur precipitate from the decomposition of residual thiosulphate and tetrathionate in the eluate. Gold co-precipitated and was recovered from the eluate by filtration. The further addition of sodium borohydride reductant improved the gold recovery from about 90% to greater than 99%, and yielded gold bullion containing very little copper (less than 1%). The filtrate contained significant amounts of thiocyanate from the original eluant, and was recycled to the elution operation. After gold elution the functional groups on the ion exchange resin were in the thiocyanate form (i.e., loaded with thiocyanate anions), and it was found that resin could be recycled directly to the last resin-in-leach adsorption stage in this form, without regeneration, and that the efficiency of gold extraction by resin in the thiocyanate form was essentially the same as with fresh resin, which is typically in chloride ion form.

EXAMPLE 2

Three gold ores from the Carlin area of Nevada were subjected to pressure oxidation under neutral or alkaline conditions and thiosulfate leaching. The head analysis of the ores was as follows:

| ELEMENT | ORE A | ORE B | ORE C |
|---|---|---|---|
| Au, g/t | 6.79 | 4.62 | 6.13 |
| Au, oz/T | 0.20 | 0.13 | 0.18 |
| Fe, % | 1.35 | 2.67 | 1.05 |
| As, % | 0.06 | 0.06 | 0.02 |
| S (t), % | 1.22 | 2.54 | 1.24 |
| S (=), % | 1.06 | 2.50 | 1.19 |
| C (t), % | 7.35 | 5.61 | 6.41 |
| C (g), % | 1.84 | 1.55 | 1.26 |
| $CO_2$, % | 20.6 | 14.9 | 15.8 |
| Al, % | 1.97 | 1.90 | 1.83 |
| Cd, % | <0.001 | <0.001 | <0.001 |
| Cu, % | 0.004 | 0.004 | 0.005 |
| Mn, % | 0.028 | 0.094 | 0.013 |
| Na, % | 0.023 | 0.077 | 0.028 |
| Sb, % | <0.005 | <0.007 | <0.005 |
| Te, % | <0.001 | <0.001 | <0.001 |

The ores were ground to at least 80% passing 200 mesh. Samples of the ore were slurried with water to a pulp density of about 40% solids and a quantity of NaCl was added.

Under laboratory batch conditions, the slurry was pressure oxidized in an autoclave under neutral or alkaline conditions for 1–3 hours at 175°–225° C. and 700 kpa oxygen overpressure. The specific times, temperatures, amounts of NaCl addition, finishing pH and sulfide oxidation achieved were as follows:

| Test No. | Ore | Grind −200M % | Time h | Temp °C. | NaCl kg/t | pH End | S (=) Oxid'n % |
|---|---|---|---|---|---|---|---|
| 51 | A | 94 | 1 | 225 | 0.05 | 6.8 | 72.2 |
| 65 | A | 94 | 1 | 225 | 0.05 | 6.8 | 72.2 |
| 58 | A | 94 | 3 | 175 | 0.25 | — | 35.4 |
| 66 | A | 94 | 3 | 175 | 0.25 | — | 35.4 |
| 59 | A | 94 | 6 | 175 | 0.25 | — | 50.0 |
| 70 | A | 94 | 1 | 225 | 0.31 | 7.4 | 77.4 |
| 71 | A | 94 | 1 | 225 | 0.31 | 7.4 | 77.4 |
| 72 | A | 94 | 1 | 225 | 0.31 | 7.4 | 77.4 |
| 73 | A | 94 | 1 | 225 | 0.31 | 7.4 | 77.4 |
| 60 | B | 97 | 1 | 225 | 0.25 | 7.1 | 60.4 |
| 64 | B | 97 | 1 | 225 | 0.25 | 7.1 | 60.4 |
| 68 | B | 97 | 1.5 | 225 | 0.25 | 6.8 | 79.2 |
| 61 | C | 83 | 1 | 225 | 0.25 | 7.2 | 61.3 |
| 62 | C | 93 | 1 | 225 | 0.25 | 7.4 | 70.6 |
| 63 | C | 99 | 1 | 225 | 0.25 | 7.3 | 68.9 |

Following pressure oxidation the slurry samples were cooled to about 50° C. and lime or sodium hydroxide (about 15–30 kg/ton) was added to raise their pH to about 9.0. A lixiviant containing 14.7 g/L ammonium thiosulfate and 1 g/L copper as copper sulfate was added to the slurry, and leaching was performed with mechanical agitation for 4 hours. The slurry was then subjected to liquid/solid separation and gold extractions were determined by fire assay of the solid residue and atomic absorption of the pregnant solution.

Slurry pHs, leach times, and gold extractions were as follows:

| Test No | pH | Res Au g/t | Head Au g/t | Ext'n Au % |
|---|---|---|---|---|
| 51 | 9.0 | 1.46 | 6.46 | 77.4 |
| 65 | 9.0 | 1.26 | 6.71 | 81.2 |
| 58 | 9.0 | 2.30 | 6.30 | 63.6 |
| 66 | 9.0 | 2.47 | 6.54 | 62.2 |
| 59 | 9.0 | 2.39 | 6.19 | 61.5 |
| 70 | 9.2 | 1.47 | 5.99 | 75.5 |
| 71 | 9.2 | 1.47 | 6.03 | 73.0 |
| 72 | 8.8 | 1.66 | 6.16 | 73.0 |
| 73 | 8.8 | 1.52 | 6.16 | 75.3 |
| 60 | 9.0 | 2.86 | 4.95 | 42.2 |
| 64 | 9.0 | 2.56 | 4.62 | 47.8 |
| 68 | 9.0 | 1.34 | 4.97 | 73.0 |
| 61 | 9.0 | 3.09 | 5.74 | 46.2 |
| 62 | 9.0 | 1.68 | 6.13 | 71.5 |
| 63 | 9.0 | 1.09 | 5.76 | 81.2 |

EXAMPLE 3

A gold ore from the Carlin area of Nevada was subjected to pressure oxidation under acidic conditions and thiosulfate leaching. The head analysis of the ore was as follows:

| ORE D | | | |
|---|---|---|---|
| Au, g/t | 3.48 | Cu, % | 0.003 |
| Au, oz/T | 0.10 | Mn, % | 0.011 |

17
-continued

| ORE D | | | |
|---|---|---|---|
| Fe, % | 1.83 | Na, % | 0.084 |
| As, % | 0.09 | Sb, % | 0.006 |
| S (t), % | 2.09 | Te, % | <0.001 |
| S (=), % | 1.79 | | |
| C (t), % | 2.44 | | |
| C (g), % | 1.58 | | |
| CO2, % | 3.1 | | |
| Al, % | 0.07 | | |
| Cd, % | <0.001 | | |

The ore was ground to at least 80% passing 200 mesh. Samples of the ore (Ore D) and ore from the previous example were slurried with water to a pulp density of about 40% solids and a quantity of $H_2SO_4$ was added. Under laboratory batch conditions, the slurry was pressure oxidized in an autoclave under acidic conditions at 700 kpa oxygen overpressure. The specific times, temperatures, amounts of $H_2SO_4$ addition, finishing pH and sulfide oxidation achieved were as follows:

| Test No. | Ore | Grind 200M % | Time h | Temp °C. | $H_2SO_4$ Kg/t | pH End | S (=) Oxid'n % |
|---|---|---|---|---|---|---|---|
| 67 | B | 97 | 1 | 225 | 232 | 0.9 | 97.2 |
| 89 | D | 82 | 1.25 | 225 | 81 | 1.0 | 95.4 |
| 118 | D | 82 | 0.5 | 225 | 92 | 0.9 | 94.2 |

Following pressure oxidation the slurry samples were cooled to about 50° C. and lime (about 65–75 kg/ton) was added to raise their pH to about 8.5–9.0. A lixiviant containing ammonium thiosulfate and copper as copper sulfate was added to the slurry, and leaching was performed with mechanical agitation for 4 hours. The slurry was then subjected to liquid/solid separation and gold extractions were determined by fire assay of the solid residue and atomic absorption of the pregnant solution. Slurry pH, reagent additions, leach times, and gold extractions were as follows:

| Test No. | pH | Am. Thios. g/l | Cu mg/L | Res Au g/t | Head Au g/t | Ext'n Au % |
|---|---|---|---|---|---|---|
| 67 | 9.0 | 14.7 | 1000 | 1.00 | 3.54 | 81.4 |
| 89 | 9.0 | 14.7 | 1000 | 0.62 | 3.17 | 78.3 |
| 118 | 9.0 | 5.0 | 200 | 0.70 | 3.18 | 78.0 |

EXAMPLE 4

A gold ore sample from the Carlin area of Nevada was subjected to pressure oxidation under alkaline conditions and thiosulfate leaching. The ore contained approximately 20% by weight carbonate (as $CO_2$), 1.1% sulfur as sulfide, and 1.8% organic carbon. The ore grade was 6.8 g/t gold. The ore was slurried with water to a pulp density of about 40% solids and about 38 g/t sodium hydroxide was added. Under laboratory batch conditions, the slurry was pressure oxidized in an autoclave under alkaline conditions for 3 hours at 225° C. and 700 kpa oxygen overpressure. Following pressure oxidation the slurry was cooled to about 50° C. and lime added to raise its pH to about 9.0. A lixiviant containing 15 g/L ammonium thiosulfate and 1 g/L copper sulfate was added to the slurry, and leaching was performed for about 4 hours with mechanical agitation. Gold extraction was determined by fire assay of the leach residue and atomic adsorption of the leach solution to be 87.9%.

EXAMPLE 5

A sample of the gold ore of Example 2 was slurried with water to a pulp density of about 40% solids. No sodium hydroxide was added. Under laboratory batch conditions, the slurry was pressure oxidized in an autoclave under alkaline conditions for 3 hours at 225° C. and 700 kpa oxygen overpressure. Following pressure oxidation the slurry was cooled to about 50° C. and lime added to raise its pH to about 9.0. A lixiviant containing 15 g/L ammonium thiosulfate and 1 g/L copper sulfate was added to the slurry, and leaching was performed for about 4 hours with mechanical agitation. Gold extraction was determined by fire assay of the leach residue and atomic adsorption of the leach solution to be 81.5%.

EXAMPLE 6

A sample of the gold ore of Example 2 was slurried with water to a pulp density of about 40% solids. No sodium hydroxide was added. Under laboratory batch conditions, the slurry was pressure oxidized in an autoclave under alkaline conditions. Following pressure oxidation the slurry was cooled to about 50° C. and lime added to raise its pH to about 8.5. A lixiviant containing 4.1 g/L (0.028M) ammonium thiosulfate, excess ammonium as 3.2 g/L ammonium sulfate, and 50 ppm copper as copper sulfate was added to the slurry, and leaching was performed for 2 hours at a temperature of 40° C. with mechanical agitation. Gold extraction was determined to be 70.7%.

EXAMPLE 7

A gold ore sample from the Carlin area of Nevada was subjected to pressure oxidation under acidic conditions and thiosulfate leaching. The ore contained 3.1% by weight carbonate (as $CO_2$), 1.79% sulfur as sulfide, and 1.58% organic carbon. The ore grade was 3.48 g/t gold. The ore was ground to 82% passing 200 mesh and 500 grams were slurried with water to a pulp density of about 40% solids. Concentrated sulfuric acid (22 ml) was added to the slurry, lowering its pH to about 2.0, where it was conditioned by removal of carbonates for about 1 hour. The slurry was then pressure oxidized under laboratory batch conditions for 75 minutes at 224° C. and an oxygen pressure of 88 psig. The pH of the pressure oxidized slurry was about 1.0. Following pressure oxidation the slurry was cooled to about 50° C. and 15% $Ca(OH)_2$ was added, and the slurry held for 1 hour, to raise its pH to about 9.0.

A first portion of the pressure oxidized residue was pulped to about 33% solids. Using a water bath, a slurry temperature of about 50° C. was established and maintained and a 0.1M ammonium thiosulfate leachant, containing 14.8 g/L $(NH_4)_2S_2O_3$ and 1 g/L Cu as $CuSO_4.5H_2O$, was added. Lime was added to raise the pH and maintain it at about 9.0. The slurry was leached for 4 hours with mechanical agitation sufficiently vigorous to pull a vortex down into the slurry. The leached slurry was filtered and washed with water. The pregnant leach/wash solution and residue were assayed for gold, demonstrating gold recovery of 78.3%.

EXAMPLE 8

A pressure oxidized gold ore slurry containing gold ore from the Carlin area of Nevada was subjected to thiosulfate leaching. Using a water bath, a slurry temperature of about 40° C. was established and maintained and a 3.7 g/L ammonium thiosulfate solution containing 50 mg/L Cu as $CuSO_4.5H_2O$ was added. Lime was added to raise the pH to above 8.0 The slurry was leached for 4 hours with mechanical agitation (200 rpm). The leached slurry was filtered and washed with water. The pregnant leach/wash solution and residue were assayed for gold, demonstrating gold recoveries noted below.

| Time hrs. | pH | Res Au g/t | Head Au g/t | Ext'n Au % |
|---|---|---|---|---|
| 1 | 8.6 | 1.79 | 5.84 | 69.4 |
| 2 | 8.6 | 1.75 | 5.97 | 70.7 |
| 4 | 8.4 | 1.77 | 6.02 | 70.6 |

EXAMPLE 9

A pressure oxidized gold ore slurry containing gold ore from the Carlin area of Nevada was subjected to thiosulfate leaching under the same conditions as the previous example, except a lower pH was used. The pregnant leach/wash solution and residue were assayed for gold, demonstrating gold recoveries noted below.

| Time hrs. | pH | Res Au g/t | Head Au g/t | Ext'n Au % |
|---|---|---|---|---|
| 2 | 8.1 | 1.72 | 5.91 | 70.9 |
| 4 | 8.4 | 1.87 | 5.85 | 68.0 |
| 4 | 8.4 | 1.77 | 6.02 | 70.6 |

EXAMPLE 10

A pressure oxidized gold ore slurry containing gold ore from the Carlin area of Nevada was subjected to thiosulfate leaching under the same conditions as the previous example, except higher pH was used and 0.3 g/L $SO_3$ was added to the leachant. The pregnant leach/wash solution and residue were assayed for gold, demonstrating gold recoveries noted below.

| Time hrs. | pH | Res Au g/t | Head Au g/t | Ext'n Au % |
|---|---|---|---|---|
| 1 | 9.1 | 1.83 | 5.28 | 65.3 |
| 4 | 8.9 | 1.80 | 5.68 | 68.3 |
| 2 | 8.5 | 1.62 | 5.75 | 68.3 |
| 4 | 9.6 | 1.85 | 5.95 | 68.9 |

EXAMPLE 11

A pressure oxidized gold ore slurry containing gold ore from the Carlin area of Nevada was subjected to thiosulfate leaching. Using a water bath, a slurry temperature of about 50° C. was established and maintained and a 3.7 g/L ammonium thiosulfate solution containing 100 mg/L Cu as $CuSO_4.5H_2O$ was added. Lime was added to raise the pH to 8.9. The slurry was leached for 8 hours with vigorous (600 rpm) mechanical agitation. The leached slurry was filtered and washed with water. The pregnant leach/wash solution and residue were assayed for gold, demonstrating gold recoveries noted below.

| Time hrs. | pH | Res Au g/t | Head Au g/t | Ext'n Au % |
|---|---|---|---|---|
| 3 | 8.9 | 2.02 | 5.80 | 85.2 |
| 6 | 8.8 | 4.43 | 5.63 | 21.3 |
| 8 | 8.6 | 4.16 | 5.88 | 29.3 |

The reduced recoveries after six and eight hours were believed to be due to ammonia losses over time, causing gold and copper to precipitate out of solution, as enhanced by the vigorous agitation.

EXAMPLE 12

Three tests were conducted in which a thiosulfate leach solution (450 mL) pregnant with gold leached from a pressure oxidized ore slurry was transferred to a 1 L bottle where it was contacted with carbon for 30 minutes while the bottle was rolled. Sodium cyanide was added in an amount calculated to equal 4 moles NaCN per mole Au, two times the stoichiometric amount for formation of a gold cyanide complex. The bottles were rolled for 24 hours, the carbon was filtered, and the carbon and filtrate were assayed for gold. The results were as follows:

| Carbon concentration | Gold recovery |
|---|---|
| 1.0 g/L | 96.9% |
| 2.0 g/L | 98.4% |
| 4.0 g/L | 99.3% |

As various changes could be made in the above embodiments without departing from the scope of the invention, it is intended that all matter contained in the above description shall be interpreted as illustrative and not in a limiting sense.

What is claimed is:

1. A process for recovering gold from a slurry comprising a solid ore residue and a gold-bearing thiosulfate lixiviant comprising:

contacting the slurry with an ion exchange resin having affinity for gold to adsorb gold from the gold-bearing thiosulfate lixiviant onto said resin;

eluting gold from said resin to produce a gold-bearing eluate; and recovering gold from the gold-bearing eluate.

2. The process of claim 1 wherein gold is recovered from the gold-bearing eluate by electrowinning.

3. The process of claim 1 wherein said ion exchange resin is a strong-base resin.

4. The process of claim 1 wherein said ion exchange resin is a weak-base resin.

5. The process of claim 1 comprising eluting the gold from said resin with a thiocyanate solution eluant.

6. The process of claim 1 wherein gold is recovered from the gold-bearing eluate by raising the pH of the eluate to between about 9.5 and about 11.5 to cause gold to precipitate.

7. A process for recovering gold from a gold-bearing thiosulfate lixiviant comprising:

contacting the gold-bearing thiosulfate lixiviant with an ion exchange resin having affinity for gold to adsorb gold from the gold-bearing thiosulfate lixiviant onto said resin;

eluting gold from said resin to produce a gold-bearing eluate; and recovering gold from the gold-bearing eluate.

8. The process of claim 7 wherein said ion exchange resin is a strong-base resin.

9. The process of claim 7 comprising eluting the gold from said resin with a thiocyanate solution eluant.

10. The process of claim 7 wherein gold is recovered from the gold-bearing eluate by raising the pH of the eluate to between about 9.5 to about 11.5 to cause gold to precipitate.

11. The process of claim 1 wherein the slurry comprises a solid ore residue and a gold-bearing and copper-bearing thiosulfate lixiviant and the ion exchange resin has an affinity for gold and copper, the process comprising contacting the slurry with the ion exchange resin to adsorb gold and copper from the lixiviant onto said resin;

eluting copper from said resin to produce a copper-bearing eluate; and eluting gold from said resin to produce a gold-bearing eluate.

12. The process of claim 11 wherein said copper is eluted from the resin with an eluant containing between about 100 g/L and 200 g/L ammonium thiosulfate.

13. The process of claim 11 wherein said copper-bearing eluate is recycled for use as a catalyst in leaching gold with thiosulfate lixiviant.

14. The process of claim 7 wherein the lixiviant is a gold-bearing and copper-bearing thiosulfate lixiviant and the ion exchange resin has an affinity for gold and copper, the process comprising contacting the lixiviant with the ion exchange resin to adsorb gold and copper from the lixiviant onto said resin;

eluting copper from said resin to produce a copper-bearing eluate; and eluting gold from said resin to produce a gold-bearing eluate.

15. The process of claim 14 wherein said copper is eluted from the resin with an eluant containing between about 100 g/L and 200 g/L ammonium thiosulfate.

16. The process of claim 14 wherein said copper-bearing eluate is recycled for use as a catalyst in leaching gold with thiosulfate lixiviant.

17. A process for recovering gold from a gold-bearing oxidized ore slurry comprising:

contacting the oxidized ore slurry with a thiosulfate lixiviant in the presence of an ion exchange resin having affinity for gold to leach gold from the ore and adsorb gold onto said resin;

eluting gold from said resin to produce a gold-bearing eluate; and recovering gold from the gold-bearing eluate.

18. The process of claim 17 wherein a system pH in the range of between 7 and 8.7 is maintained during said contacting of the oxidized slurry with lixiviant.

19. A process for recovering gold from an auriferous ore comprising the steps of:

forming an aqueous ore slurry comprising an auriferous ore;

subjecting the ore slurry to pressure oxidation in an autoclave under neutral or alkaline conditions to produce an oxidized ore slurry;

leaching gold from the oxidized slurry by mixing the oxidized ore slurry with a lixiviant comprising a thiosulfate salt to produce a leached slurry comprising a solid residue and a gold-bearing leachate;

contacting the leached slurry with an ion exchange resin having affinity for gold to adsorb gold from the gold-bearing thiosulfate leachate onto said resin;

eluting gold from said resin to produce a gold-bearing eluate; and recovering gold from the gold-bearing eluate.

20. A process for recovering gold from an auriferous ore comprising the steps of:

forming an aqueous ore slurry comprising an auriferous ore;

subjecting the ore slurry to pressure oxidation in an autoclave to produce an oxidized ore slurry;

mixing the oxidized ore slurry with a lixiviant comprising a thiosulfate salt to form a mixture of oxidized ore slurry and lixiviant;

leaching gold from the oxidized slurry by maintaining the mixture at a pH between 7 and 8.7 while agitating the mixture to produce a leached slurry comprising a solid residue and a gold-bearing leachate; and recovering gold from the gold-bearing leachate by contacting the leachate with an ion exchange resin having affinity for gold to adsorb gold onto said resin.

21. The process of claim 20 comprising contacting the leachate with said resin in the presence of said solid residue.

22. A process for recovering gold from a refractory sulfidic and refractory carbonaceous auriferous ore having preg-robbing characteristics due to the presence of organic carbon comprising the steps of:

forming an aqueous ore slurry comprising a refractory sulfidic and refractory carbonaceous ore having preg-robbing characteristics due to the presence of organic carbon;

subjecting the ore slurry to pressure oxidation in an autoclave under neutral or alkaline conditions to produce an oxidized ore slurry having a pH in the range of between about 6 and 8;

mixing the oxidized ore slurry with a lixiviant comprising a thiosulfate salt;

leaching gold from the oxidized slurry by maintaining the mixture at a pH between 7 and 8.7 to produce a leached slurry comprising a solid residue and a gold-bearing leachate; and recovering gold from the gold-bearing leachate by contacting the leached slurry with an ion exchange resin having affinity for gold to adsorb gold from the gold-bearing thiosulfate lixiviant onto said resin;

eluting gold from said resin to produce a gold-bearing eluate; and recovering gold from the gold-bearing eluate.

23. A process for recovering gold from a gold-bearing eluate resulting from the elution of gold-thiosulfate complex from an ion exchange resin with a thiocyanate solution, the eluate containing thiosulfate ions and thiocyanate ions, the process comprising adding a basic compound to the eluate to increase the pH of the eluate to between about 9.5 to about 11.5 to cause gold to precipitate.

24. The process of claim 23 wherein said basic compound is selected from the group consisting of lime and caustic soda.

25. The process of claim 23 further comprising adding a reductant to the eluate to increase gold precipitation.

26. The process of claim 7 wherein the gold-bearing thiosulfate lixiviant is prepared by:

forming an aqueous ore slurry comprising an auriferous ore;

subjecting the ore slurry to pressure oxidation in an autoclave to produce an oxidized ore slurry;

leaching gold from the oxidized slurry by mixing the oxidized ore slurry with a lixiviant comprising a thiosulfate salt to produce a leached slurry comprising a solid residue and a gold-bearing thiosulfate lixiviant.

27. The process of claim 17 wherein the gold-bearing oxidized ore slurry is prepared by:

forming an aqueous ore slurry comprising an auriferous ore; and subjecting the ore slurry to pressure oxidation in an autoclave to produce a gold-bearing oxidized ore slurry.

28. A process for recovering gold from an auriferous ore slurry comprising:

contacting the auriferous ore slurry with a thiosulfate lixiviant in the presence of an ion exchange resin having affinity for gold to leach gold from the ore and adsorb gold onto said resin;

eluting gold from said resin to produce a gold-bearing eluate; and recovering gold from the gold-bearing eluate.

29. The process of claim 28 wherein a system pH in the range of between 7 and 8.7 is maintained during said contacting of the slurry with lixiviant.

30. A process for recovering gold from an auriferous ore comprising the steps of:

contacting the ore with a lixiviant comprising a thiosulfate salt solution at a pH of between 7 and 8.7 to produce a leached slurry comprising a solid residue and a gold-bearing leachate; and recovering gold from the gold-bearing leachate by contacting the leached slurry with an ion exchange resin having affinity for gold to adsorb gold from the gold-bearing thiosulfate lixiviant onto said resin;

eluting gold from said resin to produce a gold-bearing eluate; and recovering gold from the gold-bearing eluate.

31. A process for recovering gold from an auriferous ore comprising the steps of:

forming an aqueous ore slurry comprising an auriferous ore;

mixing the ore slurry with a lixiviant comprising a quantity of thiosulfate salt in a stirred tank reactor system comprising several agitated leach tanks by progressively transferring the ore slurry from the first of said leach tanks to the last of said leach tanks while introducing a portion of said thiosulfate salt separately into a plurality of said agitated leach tanks to produce a leached slurry comprising a solid residue and a gold-bearing leachate; and recovering gold from the gold-bearing leachate by contacting the leached slurry with an ion exchange resin having affinity for gold to adsorb gold from the gold-bearing thiosulfate lixiviant onto said resin;

eluting gold from said resin to produce a gold-bearing eluate; and recovering gold from the gold-bearing eluate.

32. A process for recovering gold from a refractory sulfidic and refractory carbonaceous auriferous ore having preg-robbing characteristics due to the presence of organic carbon comprising the steps of:

forming an aqueous ore slurry comprising a refractory sulfidic and refractory carbonaceous ore having preg-robbing characteristics due to the presence of organic carbon;

subjecting the ore slurry to pressure oxidation in an autoclave to produce an oxidized ore slurry;

mixing the oxidized ore slurry with a lixiviant comprising a thiosulfate salt;

leaching gold from the oxidized slurry by maintaining the mixture at a pH between 7 and 8.7 to produce a leached slurry comprising a solid residue and a gold-bearing leachate; and recovering gold from the gold-bearing leachate by contacting the leached slurry with an ion exchange resin having affinity for gold to adsorb gold from the gold-bearing thiosulfate lixiviant onto said resin;

eluting gold from said resin to produce a gold-bearing eluate; and recovering gold from the gold-bearing eluate.

* * * * *